United States Patent
Osman et al.

(10) Patent No.: US 6,791,971 B1
(45) Date of Patent: Sep. 14, 2004

(54) METHOD AND APPARATUS FOR PROVIDING A COMMUNICATIONS SERVICE, FOR COMMUNICATION AND FOR EXTENDING PACKET NETWORK FUNCTIONALITY

(75) Inventors: Marwan Osman, Stittsville (CA); Antoine Zoghbi, Garineau (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/452,146

(22) Filed: Dec. 1, 1999

Related U.S. Application Data

(60) Provisional application No. 60/123,731, filed on Mar. 10, 1999.

(51) Int. Cl.[7] .......................... H04L 12/66; H04L 12/56; H04J 3/22
(52) U.S. Cl. ........................ 370/352; 370/356; 370/401; 370/389; 370/465
(58) Field of Search .............................. 370/401, 395.5, 370/494, 495, 352, 353, 354, 355, 356, 238, 389, 410, 465, 466, 522; 379/114.02, 900; 455/413, 435, 461

(56) References Cited

U.S. PATENT DOCUMENTS

| | | | | |
|---|---|---|---|---|
| 5,430,719 A | * | 7/1995 | Weisser, Jr. |
| 5,570,412 A | * | 10/1996 | LeBlanc |
| 5,883,939 A | * | 3/1999 | Friedman et al. |
| 5,937,053 A | * | 8/1999 | Lee et al. |
| 6,005,845 A | * | 12/1999 | Svennesson et al. |
| 6,058,303 A | * | 5/2000 | Astrom et al. |
| 6,137,869 A | * | 10/2000 | Voit et al. |
| 6,198,738 B1 | * | 3/2001 | Chang et al. |

* cited by examiner

*Primary Examiner*—Afsar Qureshi

(57) ABSTRACT

Methods, apparatus, systems, media and signals for providing a communications service are disclosed. One method involves receiving, on a packet network, a message requesting the communications service, and producing a query relating to implementation of the communications service for receipt by a Service Control Function (SCF), in response to the message, to cause the communications service to be implemented. Another method involves receiving, on a packet network, a query relating to implementation of a communications service, and producing a response to the query to cause the communications service to be implemented.

110 Claims, 14 Drawing Sheets

METHOD AND APPARATUS FOR PROVIDING A COMMUNICATIONS SERVICE, FOR COMMUNICATION AND FOR EXTENDING PACKET NETWORK FUNCTIONALITY

CROSS-REFERENCE TO RELATED APPLICATIONS

This application claims the benefit of U.S. provisional patent application serial No. 60/123,731, filed on Mar. 10, 1999.

FIELD OF THE INVENTION

The present invention relates to telephony services, and more particularly to methods and apparatus for providing a communications service, for communication and for extending packet network functionality.

BACKGROUND OF THE INVENTION

In recent years, the demand for toll-free calling services has increased significantly. For example, in North American markets, virtually all available 1-800 numbers have been assigned. As a result, an increasing number of alternative toll-free dialing prefixes, such as 1-888 and 1-877 for example, are now being adopted. This may cause confusion to some users, who may not know whether such a new dialing prefix indicates a toll-free number or not and who may therefore be reluctant to call, resulting in lost business for the subscribers to such toll-free numbers.

In addition, the telecommunications industry is increasingly shifting towards adoption of a common global Internet Protocol (IP) network. Voice-over-IP telephone calls are already possible. However, many telecommunications services, such as toll-free calling for example, are currently available only on the Public Switched Telephone Network (PSTN), and are not yet available on packet networks such as IP networks. Accordingly, toll-free numbers are often limited to specific geographic regions, such as California or the United States, for example, and are not available from other dialing locations.

Accordingly, there is a need for a better way of designating and dialing toll-free telephone numbers. More generally, there is a need for a way to provide communications services, such as toll-free calling for example, over a packet network such as an IP or ATM network, for example.

SUMMARY OF THE INVENTION

The present invention addresses the above need by providing methods and apparatus for providing a communications service, for communication and for extending packet network functionality. One such method involves establishing, on a packet network, a toll-free call. At least one network node is programmed to establish the call. Certain embodiments of the invention allow callers to easily place toll-free calls over an IP network, by double-clicking on an icon on a web page, by selecting a menu option on a wireless phone, or by dialing a toll-free number according to an extended dialing format such as a 15-digit 1-FREE-xxx-xxxx-xxxx number, for example. Such embodiments may be used to make a toll-free number available anywhere in the world, rather than limited to a particular geographic area. Users will be able to easily place such toll-free calls and to readily identify a given number, such as a 1-FREE number for example, as a toll-free number, rather than being confused by a plurality of toll-free dialing prefixes such as 1-800, 1-888, 1-877, etc.

In accordance with one aspect of the invention, there is provided a method and apparatus for providing a communications service. The method includes receiving, on a packet network, a message requesting the communications service. The method further includes producing a query relating to implementation of the communications service for receipt by a Service Control Function (SCF), in response to the message, to cause the communications service to be implemented. The apparatus includes a receiver for receiving the message and a processing unit in communication with the receiver, programmed to produce the query.

In accordance with another aspect of the invention, there is provided a method and apparatus for providing a communications service. The method includes receiving, on a packet network, a query relating to implementation of a communications service. The method further includes producing a response to the query to cause the communications service to be implemented. The apparatus includes a receiver for receiving the query and a processing unit in communication with the receiver, programmed to produce the response.

In accordance with yet another aspect of the invention, there is provided a method and apparatus for extending packet network functionality. The method includes establishing an intelligent network (IN) service on a packet network. This may include an advanced intelligent network (AIN) service on an IP network, for example. At least one node is programmed to establish the IN service.

Computer readable media, as well as computer data signals embodied in carrier waves including code segments, for directing a programmable device to perform the above methods are also provided.

Thus, embodiments of the present invention will allow callers to easily place toll-free calls over an IP network. Toll-free numbers may be made available from any calling location in the world. Callers will not only be able to dial toll-free numbers by clicking on an icon, but may also be able to dial numbers which are immediately recognizable as toll-free numbers, such as 1-FREE-54321987654, or 1-FREE-NORTEL-NC-USA, for example. Since a 15-digit extended format allows for 100-billion different 1-FREE toll-free telephone numbers as opposed to only 10-million different 1-800 numbers, the 1-FREE dialing prefix will not be exhausted in the near future, thus avoiding a plurality of confusing dialing prefixes which are not readily recognizable as toll-free numbers.

More generally, embodiments of the invention will allow a plurality of intelligent network (IN) or advanced intelligent network (AIN) services, of which toll-free calling is merely one example, to be provided over an IP network. Other examples of such AIN services include enhanced screening services or selective call diversion, selective or location-dependent call-forwarding, personal communications services (PCS), universal personal telecommunications (UPT), and enhanced billing, to name but a few.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
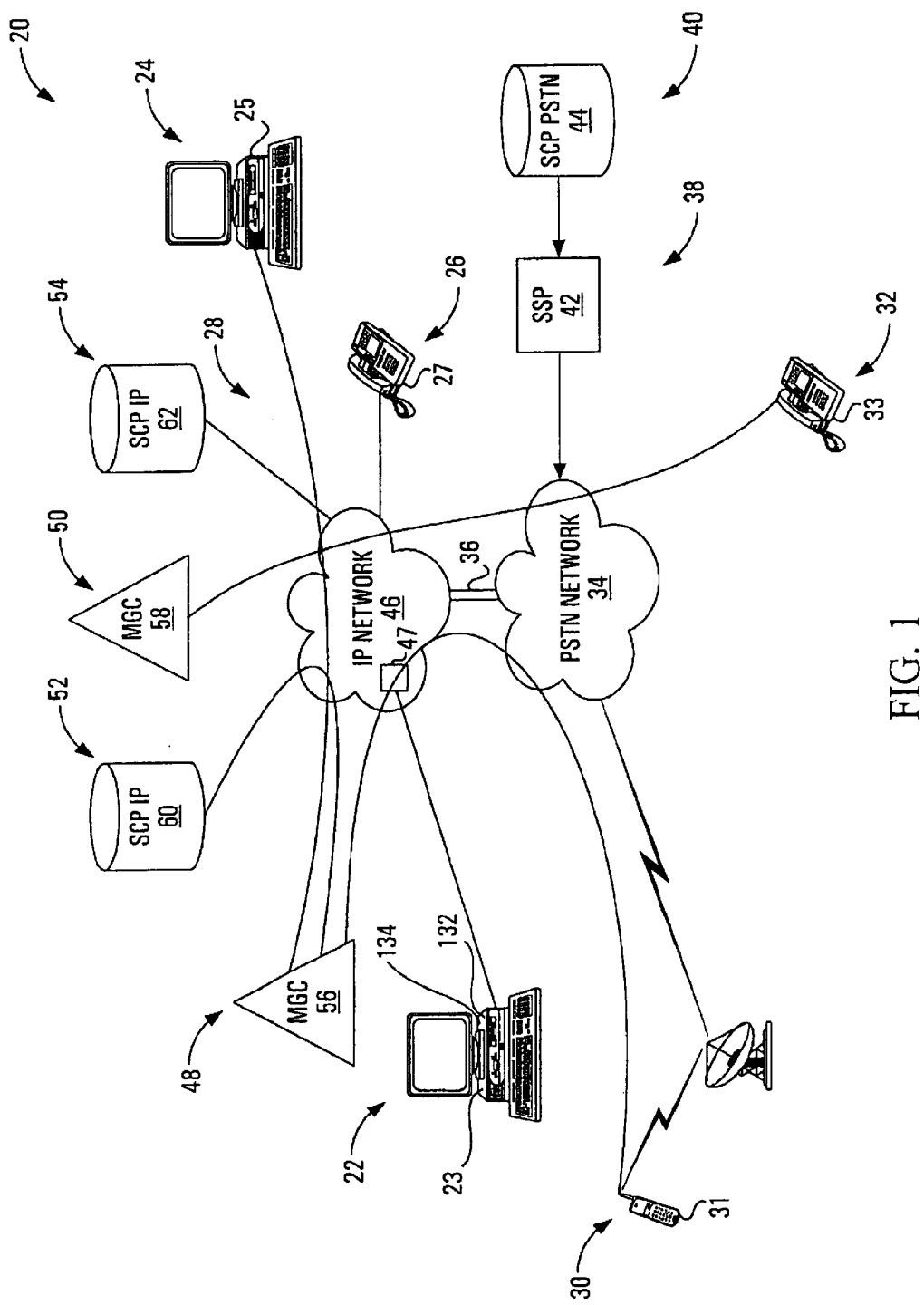
FIG. 1 is a schematic representation of a system according to a first embodiment of the invention.

As shown in FIG. 1, a system for providing a communications service, for communication and for extending packet network functionality is designated generally by the reference character 20. The system includes a first plurality of telephony devices, three of which are shown at 22, 24 and 26, in communication with a packet network 28. The system further includes a second plurality of telephony devices, two of which are shown at 30 and 32, in communication with a Public Switched Telephone Network (PSTN) 34.

The packet network 28 and the PSTN 34 are in communication with each other via a plurality of trunks, one of which is shown at 36.

PSTN

In this embodiment, the PSTN 34 includes a Signaling System No. 7 (SS7) network. The PSTN is in communication with a plurality of Service Switching Functions (SSFs), one of which is shown at 38 in FIG. 1, and with a plurality of Service Control Functions (SCFs), one of which is shown at 40.

More particularly, in this embodiment the SSF 38 includes a Service Switching Point (SSP) 42, and the SCF 40 includes a Service Control Point (SCP) 44.

Generally, the SSP 42 is a PSTN switch which serves to recognize Intelligent Network (IN) calls such as toll-free calls for example, and to route and connect them under the direction of an SCP such as the SCP 44.

The SCP 44 includes at least one database and contains Service Logic Execution Environment functionality for communicating with Advanced Intelligent Network (AIN) switching systems for processing AIN calls. For example, the SCP 44 is programmed to screen the full ten digits of a conventional toll-free 800 number and route the call to the appropriate customer-designated long distance carrier.

In this embodiment, the SSP 42 and SCP 44 are capable of performing the functions of conventional SSPs and SCPs, which are well known to those of ordinary skill in the art and need not be described further. It will be appreciated that conventional SSPs and SCPs typically employ a protocol such as the Transactional Capabilities Application Part (TCAP) protocol, which permits exchange of routing numbers having only 3, 7 or 10 digits. In this embodiment, however, in addition to such conventional functionality, the SSP 42 and SCP 44 are programmed to transmit and receive according to a new protocol which permits recognition and routing of new types of toll-free calls according to an extended dialing format More particularly, in this embodiment the new protocol is an enhancement of the Transactional Capabilities Application Part (CAP) protocol which permits the exchange of routing numbers up to 15 digits, to allow for recognition and routing of toll-free calls according to a 15-digit E.164 format. Alternatively, however, other protocols and extended dialing formats may be substituted.

The telephony device 30 includes a wireless telephone 31, and the telephony device 32 includes a Plain Old Telephone Service (POTS) telephone 33. Alternatively, other telephony devices may be substituted therefor.

Packet Network

In this embodiment, the packet network 28 includes an Internet Protocol (IP) network 46. The IP network 46 includes a plurality of gatekeepers, one of which is shown at 47. The IP network 46 is in communication with a plurality of Service Switching Functions (SSFs), two of which are shown at 48 and 50. The IP network is also in communication with a plurality of Service Control Functions (SCFs), two of which are shown at 52 and 54.

The SSFs 48 and 50 include respective Media Gateway Controllers (MGCs) 56 and 58 in this embodiment. Alternatively, the SSFs may include IP SSPs or call agent servers, for example, or any data server capable of performing SSF functionality.

Also in this embodiment, the SCFs 52 and 54 include respective Internet Protocol Service Control Points (SCP-IPs) 60 and 62.

The telephony devices 22 and 24 include respective personal computers 23 and 25 equipped with respective web telephones and modems, and the telephony device 26 includes a stand alone IP telephone 27 connected to the network through Ethernet. Alternatively, other telephony devices may be substituted therefor.

Media Gateway Controllers

Figure 2:
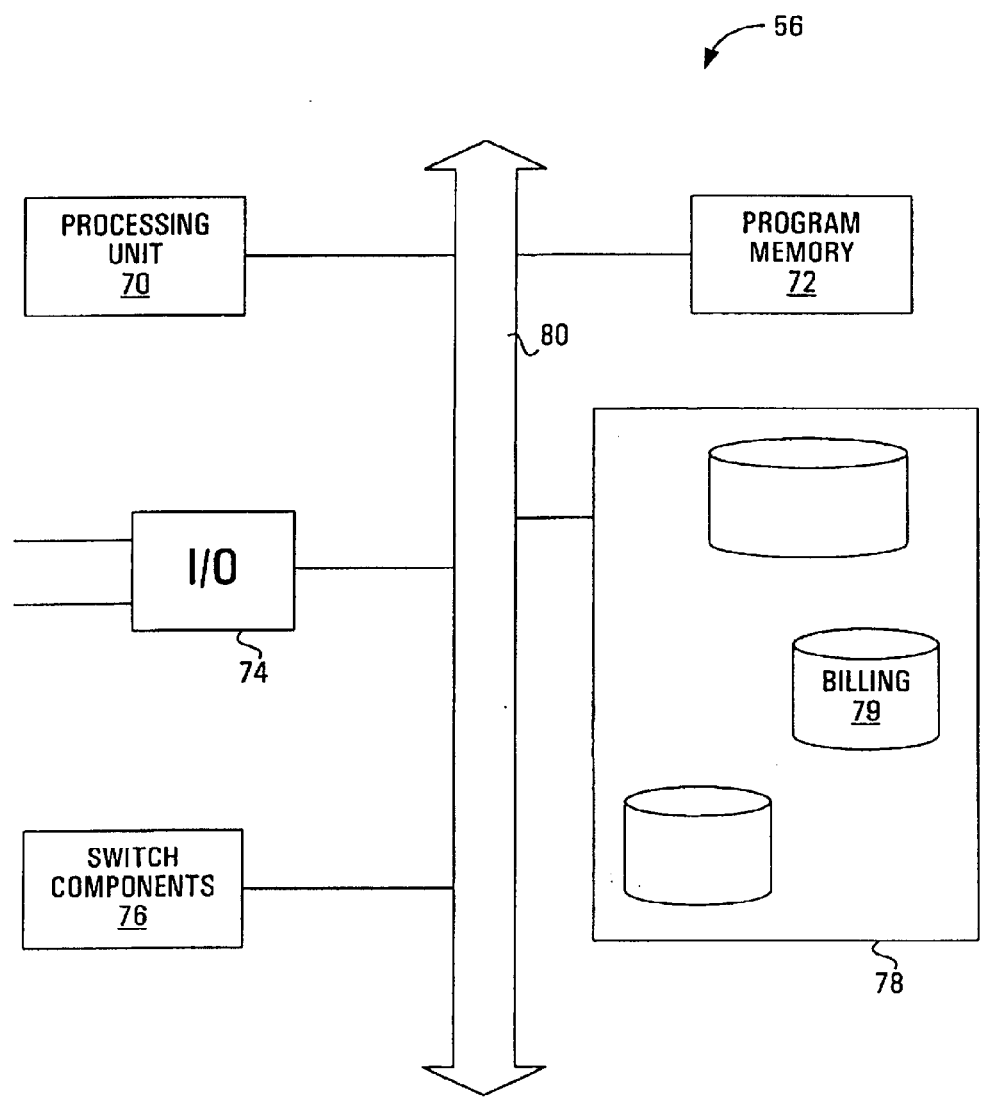
FIG. 2 is a block diagram of a Media Gateway Controller (MGC) of the system shown in FIG. 1.

As shown in FIG. 2, a representative Media Gateway Controller is designated generally by the reference character 56. In this embodiment, the MGC includes a processing unit 70 in communication with a program memory 72, an input/output (I/O) unit 74, switch components 76 and a storage device 78. Communications between these components is effected through a data bus 80.

The program memory 72 includes instruction codes for directing the processing unit 70 to execute conventional MGC functions which are known to those of ordinary skill in the art and need not be described in further detail. Included in such conventional functions is voice-over-IP calling functionality, which may be achieved by routing an IP call from the telephony device 22 shown in FIG. 1 for example, directly from the MGC 56 to a call termination such as one of the telephony devices 24 and 26.

In addition, the program memory 72 contains instruction codes including an MGC routine for directing the processing unit 70 to perform functions analogous to those of an SSP in an SS7 network. These instruction codes direct the processing unit of the MGC to query a new and inventive form of SCP-IP, to effectively provide telephony services on the packet network which were previously available only on the PSTN. For example, the program memory 72 includes codes for directing the MGC to transmit a query to the SCP-IP to request information required for performing a telephony service such as toll-free calling, either according to a conventional toll-free dialing format such as 1-800 or according to a new extended dialing format such as E.164, for example. Such a query may be transmitted according to a conventional protocol, or alternatively, may be transmitted according to a new protocol or a modified protocol, as discussed below.

In this embodiment, the program memory 72 also contains instruction codes for directing the processing unit 70 to update the contents of a billing database 79 within the storage device 78 to charge each subscriber to a toll-free calling service for each call placed to the subscriber's toll-free telephone number. Alternatively, the billing database may be stored elsewhere on the IP network 46 or the PSTN 34, and the updating may be performed by either the processing unit 70 or by any processor remote from the MGC.

The I/O unit 74 acts as a receiver for receiving, on the packet network, a message requesting a communications service. In this embodiment the I/O unit 74 is in communication with the gatekeeper 47 shown in FIG. 1 for receiving the message from the gatekeeper. Alternatively, the message may be received from any other location. The I/O unit also acts as a transmitter in communication with the processing unit and with an SCF for communicating a query to the SCF.

IP Service Control Points

Figure 3:
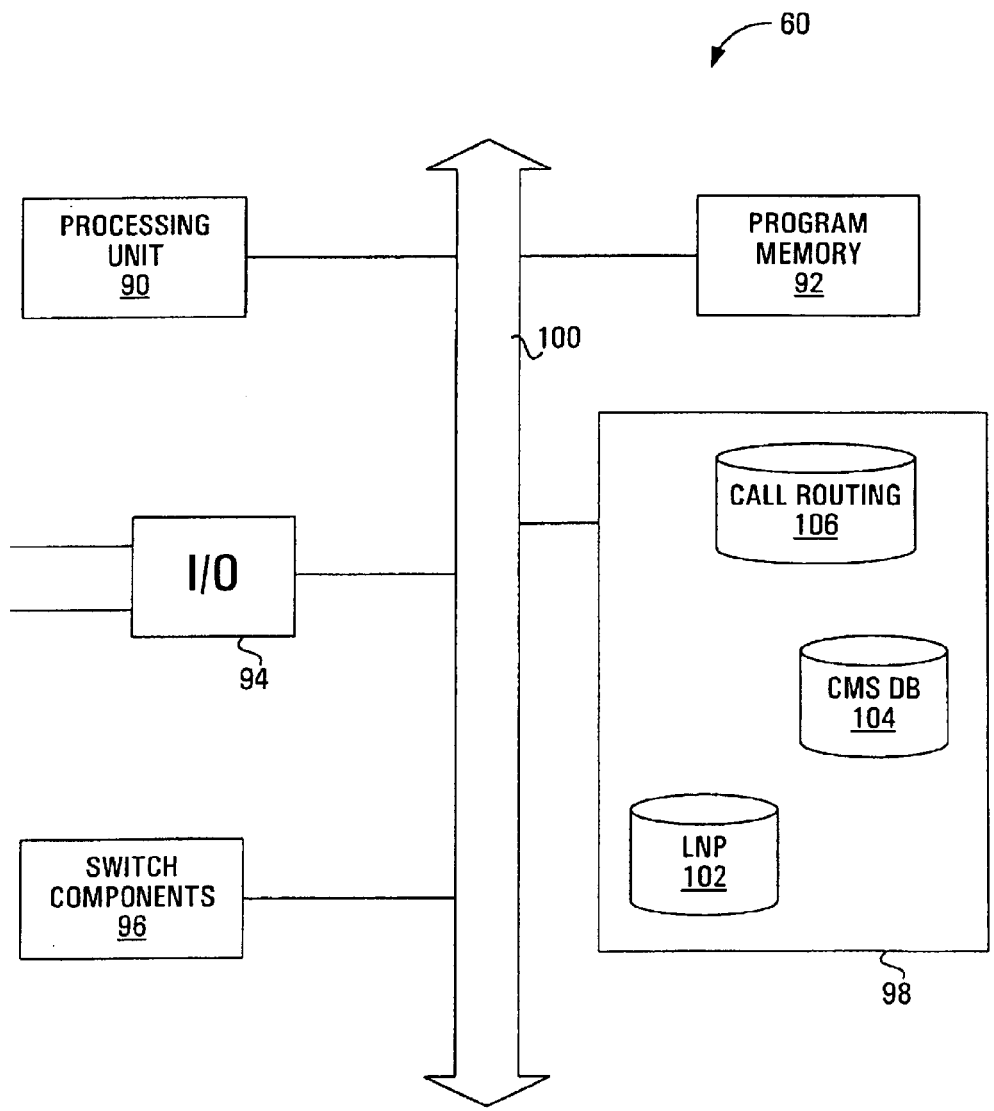
FIG. 3 is a block diagram of an Internet Protocol (IP) network Service Control Point (SCP-IP) of the system shown in FIG. 1.

As shown in FIG. 3, a representative SCP-IP is designated generally by the reference character 60. The SCP-IP 60 includes various processing circuits including a processing unit 90, a program memory 92, an input/output (I/O) unit 94, switch components 96 and a storage device 98. These processing circuits are interconnected by a bus 100, although it will be appreciated that such circuits may alternatively communicate via other means such as a shared network or shared memory, for example.

The I/O unit 94 acts as a receiver for receiving, on the packet network, a query relating to implementation of a communications service. More particularly, in this embodiment the receiver is in communication with at least one SSF for receiving from the SSF a query relating to implementation of a toll-free call. For example, the I/O unit may be used to receive calls or call queries from an SSF, such as a data server or MGC on an IP network or an SSP on the PSTN 34. The I/O unit may also be used to access other databases such as a business services database (BSDB) for example. The I/O unit 94 also acts as a transmitter in communication with the processing unit for communicating a response to the query, back to the SSF for example.

The storage device 98 includes a number of databases, such as, for example, a local number portability (LNP) database 102, a call management services database (CMSDB) 104 and a call routing database 106.

The program memory 92 includes codes for directing the SCP-IP to perform functions analogous to those performed by a conventional SCP on the PSTN network. It will be appreciated that such functions have not been previously available on a packet network such as an IP network. More particularly, the program memory 92 includes codes for directing the SCP-IP to respond to a query from an SSF by accessing the storage device 98 and transmitting information corresponding to the query back to the SSF, for performance of a communications service. For example, the program memory 92 programs the processing unit 90 to respond to toll-free calling queries from an MGC or SSP by accessing the call routing database 106 and by transmitting a routing number corresponding to the query back to the MGC or SSP, to allow the MGC or SSP to route and complete the toll-free call. The program memory programs the processing unit to respond in this manner not only to queries for conventional toll-free calls such as 1-800 calls, but also to toll-free calls according to an extended dialing format such as E.164 for example. Such queries and responses may be received and transmitted either according to conventional protocols, or alternatively according to a new or a modified protocol as discussed below.

Hyperdial construct

In one embodiment of the invention, a toll-free telephone call may be initiated by selection of a hyperdial construct on one of the personal computers 23 or 25 shown in FIG. 1, or alternatively on the wireless telephone 31 shown in FIG. 1.

Figure 4:
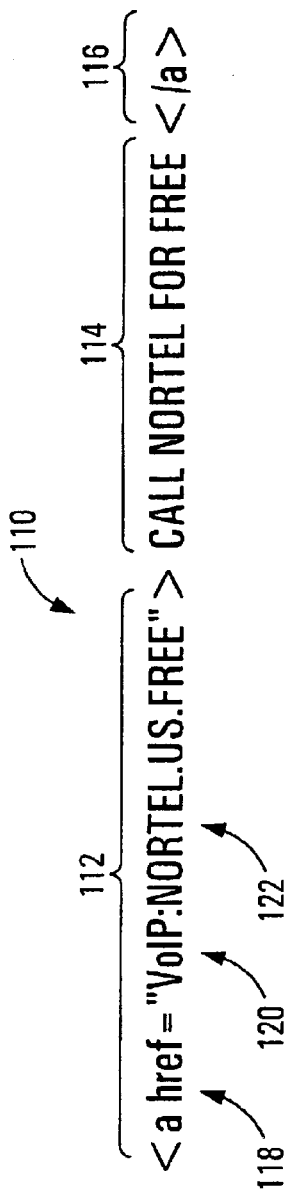
FIG. 4 is a schematic representation of a first embodiment of a hyperdial construct used by the system shown in FIG. 1.

As shown in FIG. 4, an embodiment of a hyperdial construct is designated generally by the reference character 110. In this embodiment, the hyperdial construct includes hyperdial construct codes which are provided by a tagged hypertext markup language (HTML) block including a tag portion 112, a display portion 114 and an end tag 116.

The tag portion 112 includes an HTML command identifier 118, a flag portion 120 and a stored address portion 122. In this embodiment, the flag portion 120 is indicated as "VoIP" indicating a voice-over-IP call and the stored address portion 122 is a Domain Naming System (DNS) alias "NORTEL.US.FREE" identifying a DNS alias of an IP address to which a toll-free call may be placed. The flag portion 120 and the stored address portion 122 are enclosed in quotation marks and are separated by a colon. Alternatively, any other separator may be used.

Figure 5:
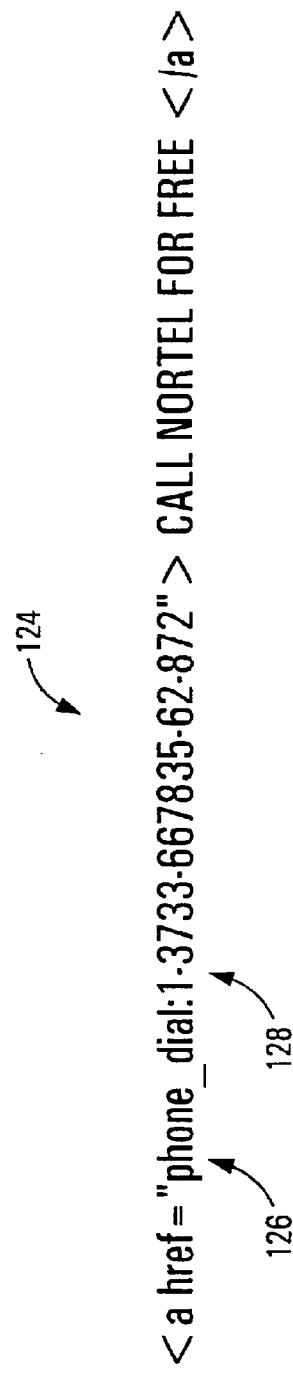
FIG. 5 is a schematic representation of a second embodiment of a hyperdial construct used by the system shown in FIG. 1.

Alternatively, other forms of stored addresses, such as IP addresses or telephone numbers for example, may be substituted. As shown in FIG. 5, an exemplary alternative hyperdial construct 124 may include a flag portion 126 indicated as "phone_dial" and a stored address portion 128 containing a string representing a toll-free telephone number, which in this case is a toll-free telephone number according to an extended E.164 dialing format, namely, 1-3733-667835-62-872 representing 1-FREE-NORTEL-NC-USA as dialed on a telephone.

Generally, the HTML command identifier, flag portion and stored address portion may be used to store instructions for directing a personal computer such as those shown at 23 and 25 in FIG. 1 to dial either a conventional 1-800 toll-free number or an extended format toll-free number such as that shown in FIG. 4, over either the PSTN 34 or the IP network 46.

Referring back to FIG. 4, in this embodiment, the display portion 114 includes a string, "CALL NORTEL FOR FREE". The display portion is intended to be displayed and visually differentiated by color for example, by a browser running on the computer 23 or 26 when the hyperdial construct 110 is included within an HTML document and displayed in a browser window on the computer. The display portion may alternatively include other words, phrases, icons or graphics symbols, for example.

The hyperdial constructs shown in FIGS. 4 and 5 are preferably provided in HTML files. Alternatively, the hyperdial constructs may be included in any other document description language, such as other SGML-related languages including XML, for example. A file containing a hyperdial construct may be loaded by the computer 23 or 25 from a website on the World Wide Web or from any other location on the IP network 46, for example.

Alternatively, a similar hyperdial construct may be provided on a wireless telephony device such as the wireless telephone 31 shown in FIG. 1, for example. As is known in the art, a user of the wireless telephone 31 may navigate through various menu options, such as options to dial internet service providers, for example. Such menu options may be displayed as text or as bitmap graphics, for example, and the menu options may be selected in a myriad of ways, such as activating scroll keys to scroll through a list of displayed options or pressing a touch-sensitive screen, for example. According to one embodiment of the invention, a hyperdial construct similar to that shown in FIG. 1 may be added to the menu of options to effectively add a new "CALL FREE" option to the menu. In response to selection of the hyperdial construct, the wireless telephone may dial a toll-free number according to an extended dialing format, such as the number shown at 128 in FIG. 5, for example. Alternatively, a special key may be provided on the wireless telephone to effectively select a hyperdial construct.

Operation

Toll-free Call Initiated on IP Network

Referring to FIGS. 1, 4 and 5, in one embodiment of the invention, a user of the computer 23 shown in FIG. 1, while browsing on the Internet, may be presented with a browser window presenting one or more hyperdial constructs such as those shown in FIGS. 4 and 5. The user may select a particular hyperdial construct by clicking on the display portion 114 of the hyperdial construct 110 shown in FIG. 4, for example.

Phone Application

Figure 6:
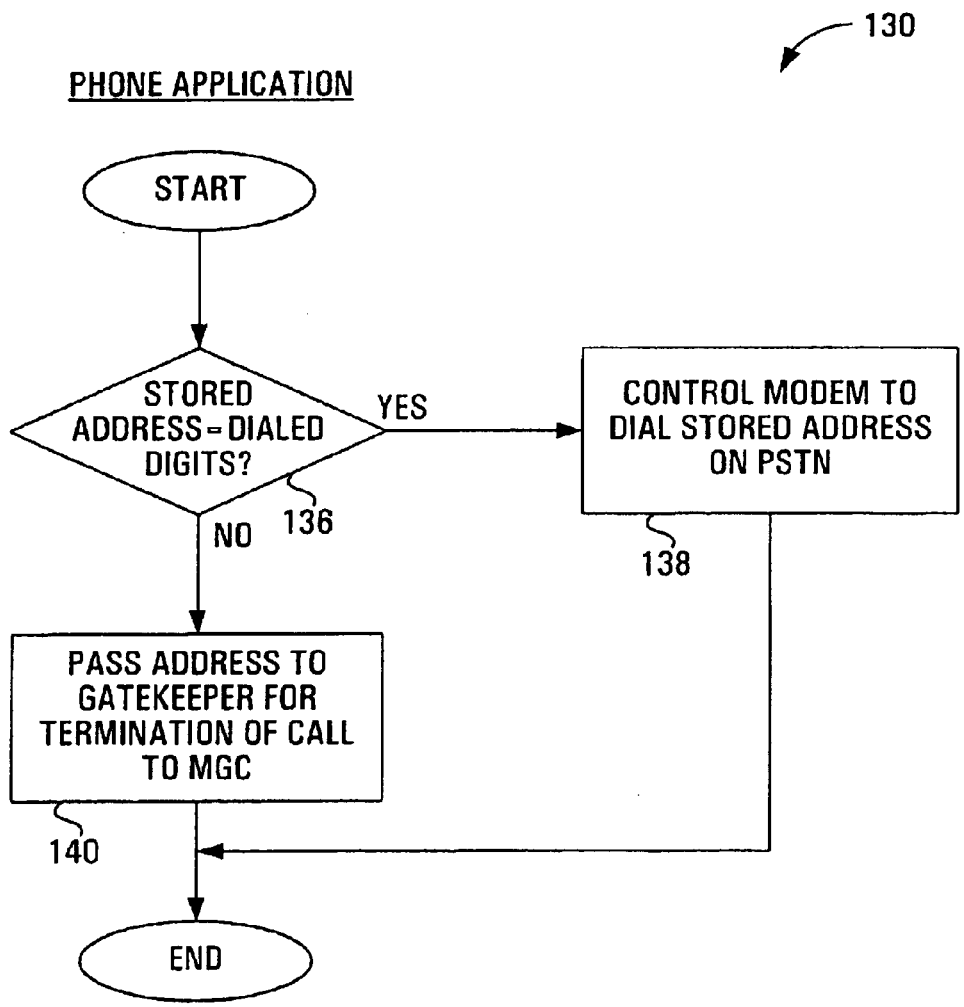
FIG. 6 is a flow chart of a phone application executed by a processor of the system shown in FIG. 1.

Referring to FIGS. 1 and 6, in response to the user's selection of a hyperdial construct, a phone application 130 is invoked to establish, translate and route a call from the personal computer 23 to an SSF. In this embodiment, the phone application 130 includes a JAVA ™ applet which, in response to selection of a hyperdial construct, is downloaded from a web server (not shown) into a Random Access Memory (RAM) 132 of the computer 23 and executed by a processor 134 of the computer 23. Alternatively, the phone application may include other types of applications, such as other software executed on the computer 23 or an application executed on the web server on which a web page containing the hyperdial construct resides, for example.

As shown in FIG. 6, the phone application 130 begins with a first block of codes 136 which directs the processor 134 of the computer 23 to determine whether the stored address portion of the hyperdial construct represents dialed digits such as the stored address shown at 128 in FIG. 5. If it does represent dialed digits, block 138 directs the processor to control a modem (not shown) of the computer 23 to dial the digits of the stored address to initiate a call over the PSTN 34 shown in FIG. 1. Alternatively, block 138 may direct the processor to initiate a call over the IP network, as described below. The phone application 130 is then ended.

If at block 136 the stored address does not represent dialed digits, block 140 directs the processor 134 to transmit the contents of the stored address portion, which may be a DNS alias such as that shown at 122 in FIG. 4 or an IP address for example, to a gatekeeper of the IP network 46 such as the gatekeeper 47 shown in FIG. 1 for example, for subsequent routing of the call to an appropriate MGC. The phone application is then ended.

Gatekeeper

Referring back to FIG. 1, the gatekeeper 47 is programmed to produce a message requesting the communications service, as a setup message. More particularly, the gatekeeper 47 is programmed to include in the setup message a stored address relating to the communications service. The stored address may relate to a destination of a toll-free call, for example. The gatekeeper may include in the setup message, as the stored address, a DNS alias, IP address or digits according to an extended dialing format such as the E.164 format, for example.

More particularly, upon receiving a stored address from the computer 23 at block 140 of the phone application shown in FIG. 6, the gatekeeper 47 of the IP network 46 is programmed to perform address resolution and to terminate the IP call to an appropriate Media Gateway Controller. Where the gatekeeper receives the stored address "NORTEL.US.FREE" shown in FIG. 4, for example, the gatekeeper first interprets "FREE" as a key word and thus recognizes the IP call as being of a "call free" type, then routes the IP call to an MGC associated with the stored address, such as the MGC 56 shown in FIG. 1, for example. The gatekeeper is programmed to include the stored address in a call setup message and to communicate the setup message to the MGC.

MGC Routine

Figure 7:
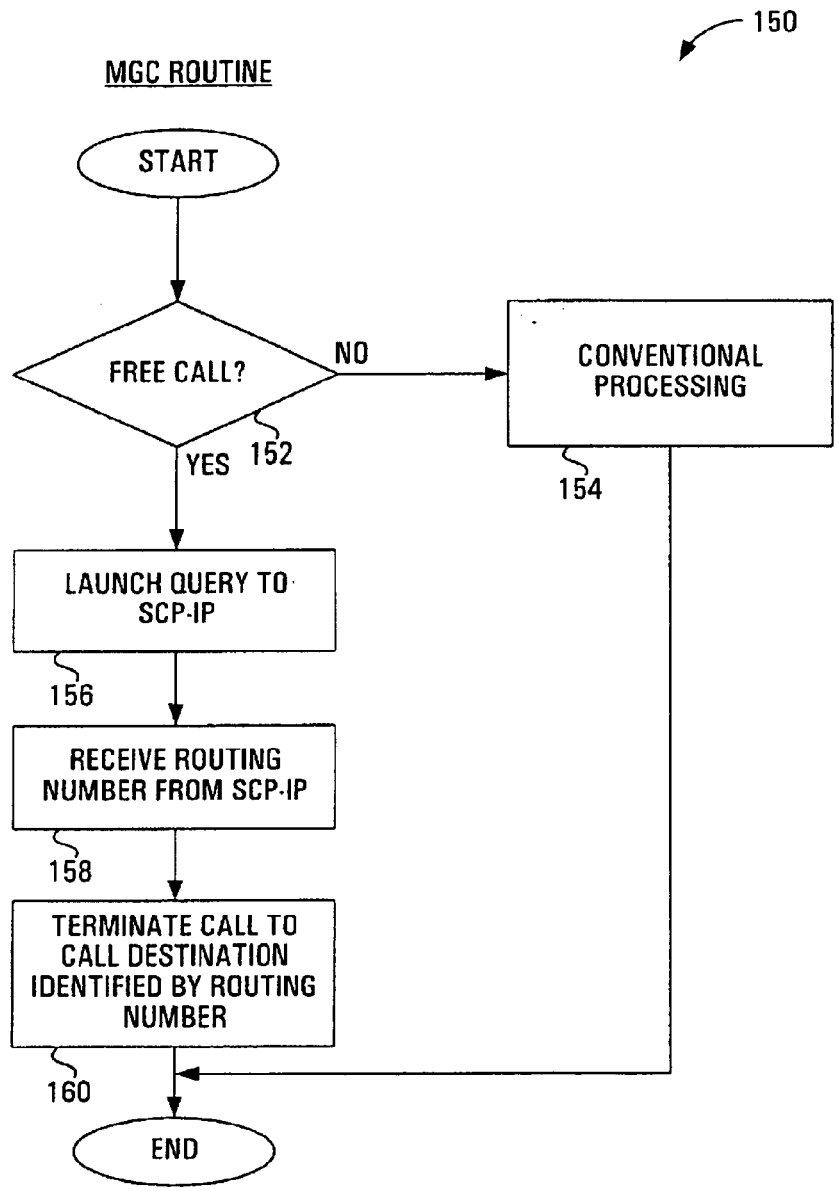
FIG. 7 is a flowchart of an MGC routine executed by a processing unit of the MGC shown in FIG. 2.

As shown in FIG. 7, a Media Gateway Controller (MGC) routine is designated generally by the reference character 150. In this embodiment, the MGC routine is stored in the program memory 72 of the representative MGC shown in FIG. 2. However, it will be appreciated that the program memory 72 is merely one example of a computer readable medium for providing instructions for directing a programmable device to perform the functionality of the MGC routine. Generally, any alternative methods or structures for generating a computer data signal embodied in a carrier wave comprising code segments for directing a programmable device to perform equivalent functions to those described herein are not considered to depart from the scope of the present invention.

Referring to FIGS. 1, 2 and 7, when a message requesting a communications service is received at the I/O unit 74 of the MGC, the MGC routine 150 directs the processing unit 70 to produce a query relating to implementation of the communications service for receipt by a Service Control Function, in response to the message, to cause the communications service to be implemented.

For example, in response to receiving a call setup message requesting a toll-free call from a gatekeeper of the IP network 46, the MGC routine 150 serves to build and transmit a query to a Service Control Point which is preferably on the IP network 46 shown in FIG. 1, but which may alternatively be located elsewhere, such as on the PSTN 34 for example. Effectively, in this embodiment, the MGC is a network node programmed to establish a toll-free call on the packet network. Alternatively, the MGC routine may be varied such that the MGC acts as a network node programmed to establish an intelligent network (IN) service on the packet network. Such variations would be apparent to one of ordinary skill in the art upon reading this specification and are not considered to depart from the scope of the present invention.

The MGC routine 150 begins with a first block of codes 152 which directs the processing unit 70 to examine the stored address portion in the message provided by the gatekeeper to determine whether or not the call is a new form of toll-free call. For example, if the stored address portion contains dialed digits beginning with "3733" (FREE) or if the stored address portion ends with the DNS alias portion ".FREE" or corresponding IP address portion, the processing unit will recognize such address portions as representing a new form of toll-free call. If the call is not a new form of toll-free call, block 154 directs the processing unit 70 to proceed with conventional processing steps, and the MGC routine is ended. For example, if the MGC receives a 1-800 call or alternatively a conventional call which is not toll-free, block 154 directs the processing unit to route the call to the PSTN, so that existing services such as conventional 1-800 services will not be impacted.

If at block 152 the stored address portion represents a new form of toll-free call, block 156 programs the processing unit 70 to produce or construct a query relating to implementation of the toll-free call and to control the I/O unit 74 to communicate the query to an SCF. In this embodiment, block 156 programs the processing unit to produce and communicate a query to the SCP-IP 60 on the IP network 46 according to an IP-encapsulated enhanced Transactional Capabilities Application Part (TCAP) protocol. The enhancement provides for the full stored address, such as a DNS alias, IP address or extended E.164 dialing format telephone number, for example, to be included in the query, in contrast with the previous 10-digit limit of the TCAP protocol. Alternatively, however, block 156 may direct the processing unit to communicate the query to an SCP on the PSTN 34, such as the SCP 44 shown in FIG. 1 for example.

Block 158 then directs the processing unit 70 to cooperate with the I/O unit 74 to receive information from the SCF in response to the query. The information is preferably received in an IP encapsulated enhanced TCAP protocol message as described above. In this embodiment, when a response such as information including a routing number is received at the I/O unit 74 from the SCP-IP 60, block 158 directs the processing unit to temporarily store the routing number in an internal memory of the processing unit.

Block 160 then directs the processing unit 70 to implement the communications service in response to receiving the information from the SCF. In this embodiment, block 160 directs the processing unit to implement the toll-free call by terminating or completing the call to a call termination identified by the routing number. For example, referring to FIG. 1, the processing unit 70 may terminate the call to a destination on the IP network 46 such as one of the telephony devices 24 or 26, for example. Alternatively, the processing unit 70 may be directed to terminate the call to a destination on a telephone network such as the wireless telephone 31 or the POTS telephone 33 in communication with the PSTN 34, which may entail first routing the call to a second MGC such as the MGC 58 for example.

Block 162 then directs the processing unit to update the contents of the billing database 79 to effectively charge a subscriber associated with the toll-free number for the call. Alternatively, if the billing database is remote from the MGC, block 162 may direct the MGC to remotely update the database or to signal a remote processor to do so. Other ways of updating billing information will be apparent to one of ordinary skill in the art upon reading this specification. The MGC routine is then ended.

SCP-IP Routine

Figure 8:
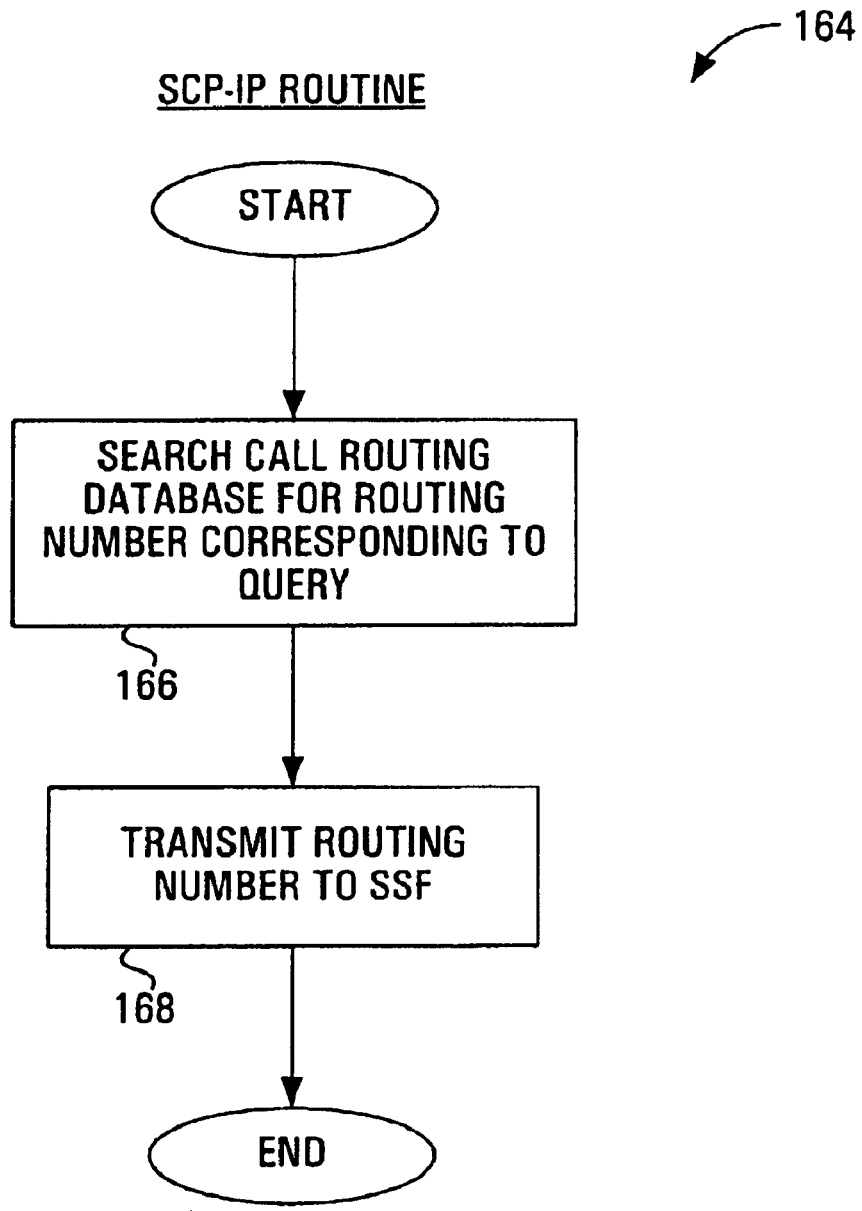
FIG. 8 is a flowchart of an SCP-IP routine executed by a processing unit of the SCP-IP shown in FIG. 3.

As shown in FIG. 8, an SCP-IP routine is designated generally by the reference character 164. In this embodiment, the SCP-IP routine is embodied in instruction codes stored in the program memory 92 of the SCP-IP 60 shown in FIG. 3. However, the program memory 92 is merely one example of a computer readable medium for providing instructions for directing a programmable device to perform the functionality of the SCP-IP routine. Generally, any alternative methods or structures for generating a computer data signal embodied in a earner wave comprising code segments for directing a programmable device to perform equivalent functions to those described herein are not considered to depart from the scope of the present invention.

Generally, referring to FIGS. 1, 3 and 8, when a query relating to implementation of a communications service is received on the IP network at the I/O unit 94, the SCP-IP routine 164 programs the processing unit 90 to produce a response to the query, to cause the communications service to be implemented.

In this embodiment, the SCP-IP routine 164 is initiated upon receiving a query from an SSF, such as the MGC 56 or the SSP 42 shown in FIG. 1. The query may include a query according to a conventional protocol, but preferably includes a query according to the IP encapsulated enhanced TCAP protocol such as that produced at block 156 of the MGC routine 150 discussed above. In this embodiment the query relates to implementation of a toll-free call.

The SCP-IP routine begins with a first block of codes 166 which directs the processing unit 90 of the SCP-IP 60 to search the call routing database 106 for a routing number corresponding to the stored address portion contained in the query received from the SSF.

Upon locating the routing number, block 168 directs the processing unit 90 to produce a response including the routing number located at block 166 for implementing the toll-free call, and to control the I/O unit 94 to communicate the response to the SSF which sent the query. In this embodiment the response is transmitted according to the aforementioned IP encapsulated enhanced TCAP protocol to permit transmission of responses including routing numbers according to an extended dialing format such as E.164, for example. Alternatively, other protocols and extended dialing formats will be apparent to one of ordinary skill in the art upon reading this specification and are not considered to depart from the scope of the present invention. The SCP-IP routine is then ended.

Toll-free Call Initiated on PSTN or Wireless Extension Thereof

In the embodiment described above, a toll-free call may be initiated by any of the telephony devices 22, 24 and 26 which are in direct communication with the IP network 46. Alternatively, however, embodiments of the invention also allow toll-free calls to be initiated on the PSTN 34 shown in FIG. 1. Such calls may then remain on the PSTN, or alternatively they may be routed in whole or in part across the IP network. For example, a toll-free call may be placed from the telephone 33 shown in FIG. 1. The SSP 42 may then launch a query to either the SCP 44 or an SCP-IP such as those shown at 60 and 62, for example.

Figure 9:
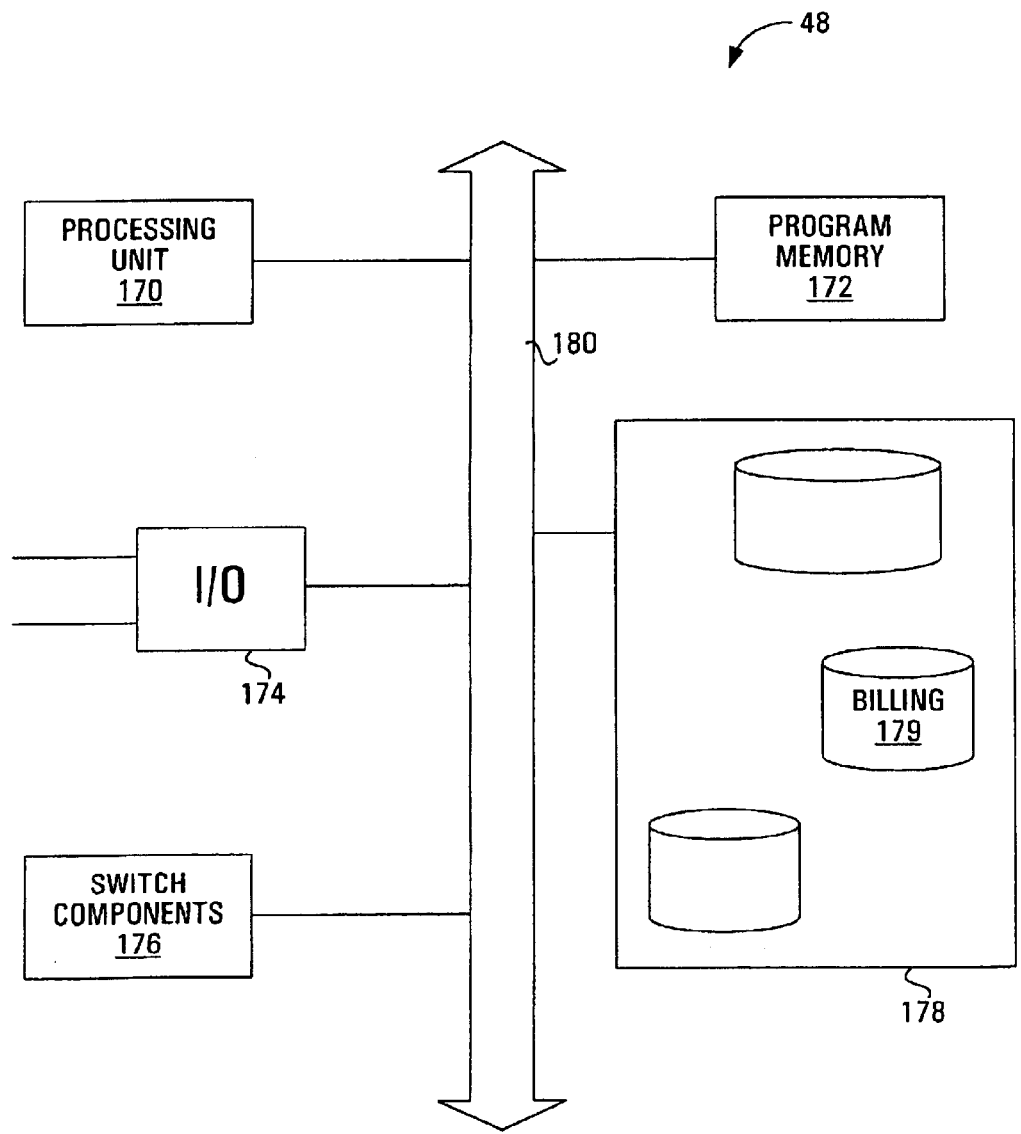
FIG. 9 is a block diagram of a Service Switching Point (SSP) of the system shown in FIG. 1.

Referring to FIGS. 1 and 9, a representative Service Switching Point (SSP) of the PSTN 34 is shown generally at 48 in FIG. 9. The SSP 48 is structurally similar to a conventional SSP and includes a processing unit 170 in communication with a program memory 172, an input/output (I/O) unit 174, switch components 176 and a storage device 178. Communications between these components is effected through a data bus 180.

However, the contents of the program memory 172 differentiate the SSP 48 from a conventional SSP. In this embodiment, the program memory 172 contains instruction codes which include an SSP routine for directing the processing unit 170 to receive and recognize a call dialed according to an extended dialing format, and to build and launch a form of SCP query according to the present embodiment of the invention.

Figure 10:
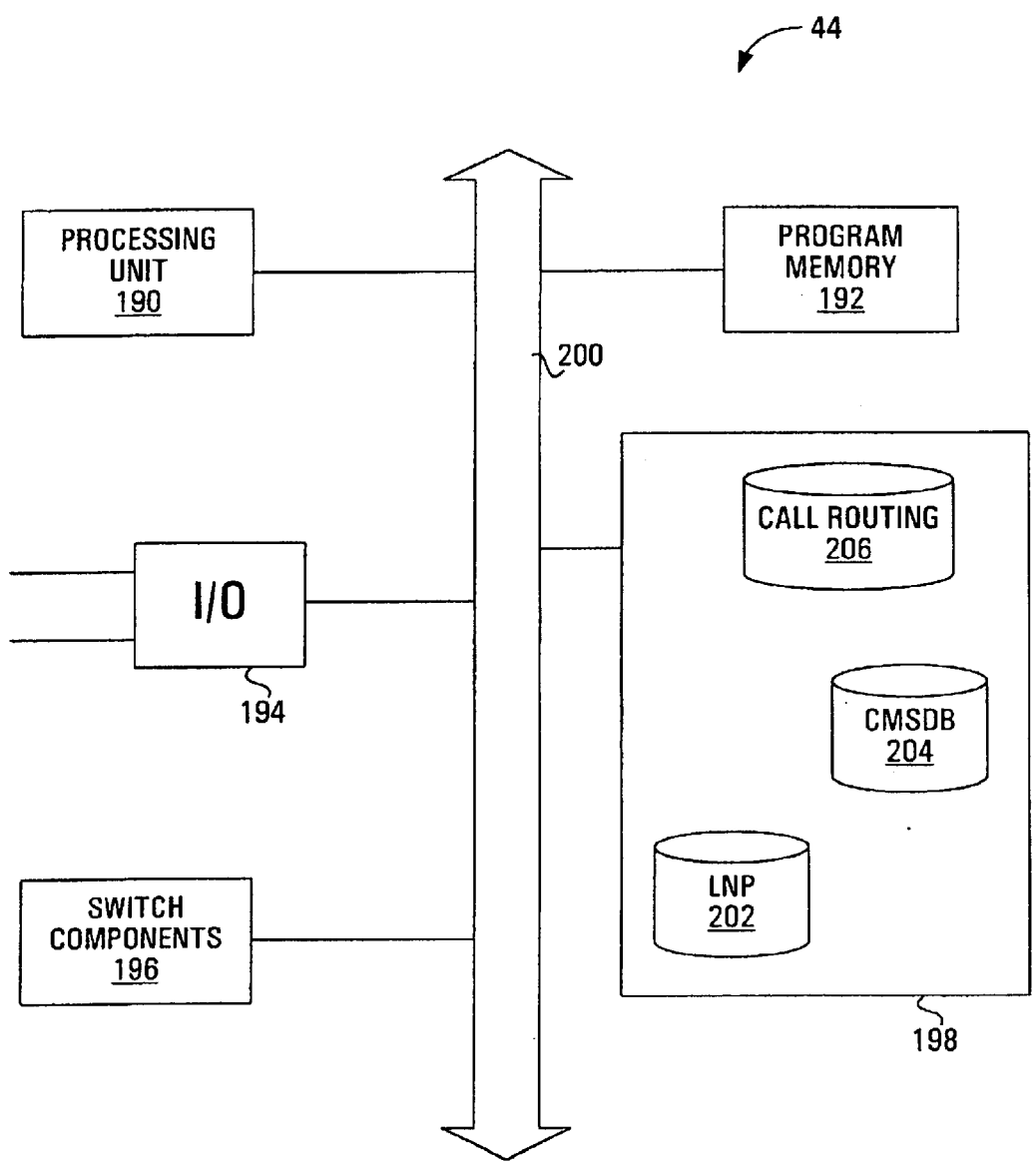
FIG. 10 is a block diagram of a Service Control Point (SCP) of the system shown in FIG. 1.

Referring to FIGS. 1 and 10, a representative Service Control Point is shown generally at 44 in FIG. 10. The SCP 44 is structurally similar to a conventional SCP and includes a processing unit 190, a program memory 192, an input/output (I/O) unit 194, switch components 196 and a storage device 198, interconnected by a bus 200. The storage memory includes various databases including a local number portability database 202, a call management services database 204 and a call routing database 206. The program memory 192 contains instruction codes including an SCP routine for directing the processing unit 190 to respond to an unconventional query from an SSF, which in this embodiment includes a query according to the enhanced TCAP protocol referred to above.

SSP Routine

Figure 11:
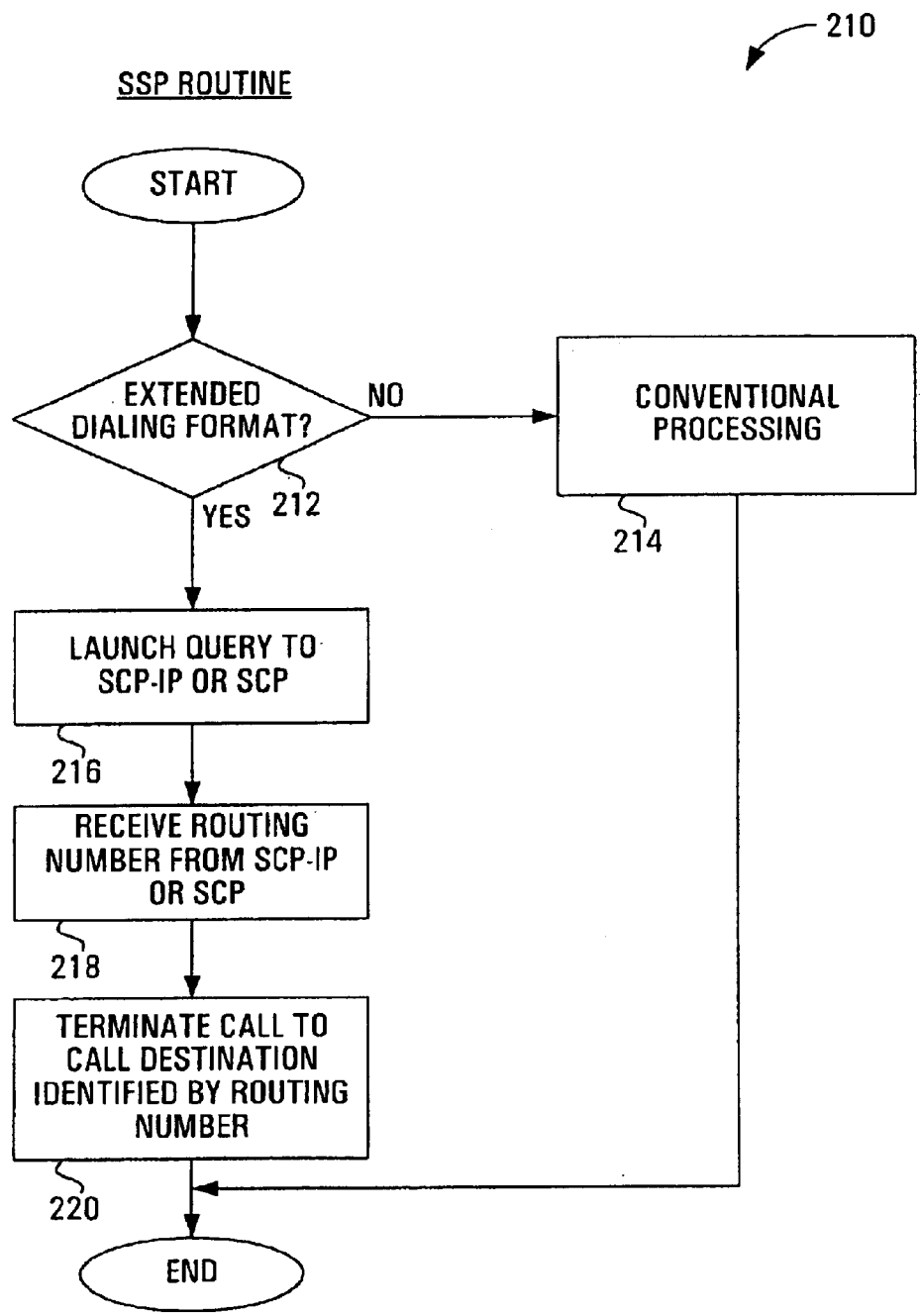
FIG. 11 is a flowchart of an SSP routine executed by a processing unit of the SSP shown in FIG. 9.

As shown in FIG. 11, the SSP routine is shown generally at 210. In this embodiment, the SSP routine is stored in the program memory 172 of the SSP 48 shown in FIG. 9. The SSP routine is initiated upon receiving a telephone call at the SSP. For example, referring back to FIG. 1, when a user of the telephone 33 dials a number beginning with "1-3733" or "1-FREE", the call is established and terminated to the SSP 48.

Referring to FIGS. 1, 9 and 11, the SSP routine 210 begins with a first block of codes 212 which directs the processing unit 170 of the SSP 48 to examine the number dialed by the telephone 33 to determine whether the number conforms to the E.164 extended dialing format, such as "1-FREE" for example. If it does not (for example, if the dialed number is a 1-800 number) then the processing unit is directed at block 214 to process the call conventionally, and the SSP routine is then ended.

If the dialed number conforms to the extended dialing format, block 216 directs the processing unit 170 of the SSP to build and launch a query to a Service Control Function such as the SCP-IP 60 on the IP network 46 or the SCP 44 on the PSTN 34 shown in FIG. 1, according to the enhanced TCAP protocol. The full stored address, which in this embodiment is the extended E.164 dialing format telephone number, is included in the query.

Whether the queried SCF is the SCP-IP 60 or the SCP 44, it will be appreciated that the SCF will respond to the query in a manner similar to that described above for the SCP-IP 60 under the direction of the SCP-IP routine 164. Accordingly, the operation of the SCP 44 will not be described in further detail.

Block 218 then directs the processing unit 170 to await receipt of a routing number from the SCF in response to the query, and to temporarily store the routing number in an internal memory of the processing unit when it is received.

Block 220 then directs the processing unit 170 to terminate or complete the call to a call termination identified by the routing number, such as the telephony device 24 on the IP network 46 or the wireless telephone 31 in communication with the PSTN 34 for example. The SSP routine is then ended.

Exemplary Signal Flow

Alternatively, a toll-free call may be initiated on the PSTN without the need for an SSP on the PSTN to construct a query. For example, referring back to FIGS. 1 and 7, in response to dialing of a toll-free call by the telephone 33, a local exchange carrier (not shown) of the PSTN 34 may route the call across the trunk 36 to a gatekeeper of the IP network 46 and then route the call to the MGC 56 for execution of the MGC routine 150 as described above in FIG. 7. In the latter case, the stored address portion provided by the gatekeeper to the MGC prior to execution of block 152 of the MGC routine would include dialed digits such as a 1-800 number or a toll-free number according to an extended dialing format such as a 1-FREE number, rather than a DNS alias or IP address. The toll-free call may thus be routed in this manner from the PSTN across the IP network and back to a call termination on the PSTN.

As shown in FIGS. 12A to 12D, an exemplary signal flow for implementing the present embodiment of the invention is designated generally by the reference character 300. The exemplary signal flow 300 is not intended to be limiting, as one of ordinary skill in the art presented with this specification will be able to conceive of other ways of implementing embodiments of the invention. For example, although the exemplary signal flow describes a query launched from the terminating MGC, alternatively a query may be launched from the originating MGC or from another Service Switching Function.

Generally, the exemplary signal flow 300 describes a message call flow for a PSTN-IP-PSTN call. The call is originated in the PSTN network and is terminated to another PSTN network. The IP carrier performs the database query from the destination MGC. The exemplary signal flow 300 describes the signal flow at the IP network side only, since in the present embodiment, signaling at the PSTN side is essentially conventional and need not be described.

Figure 12A:
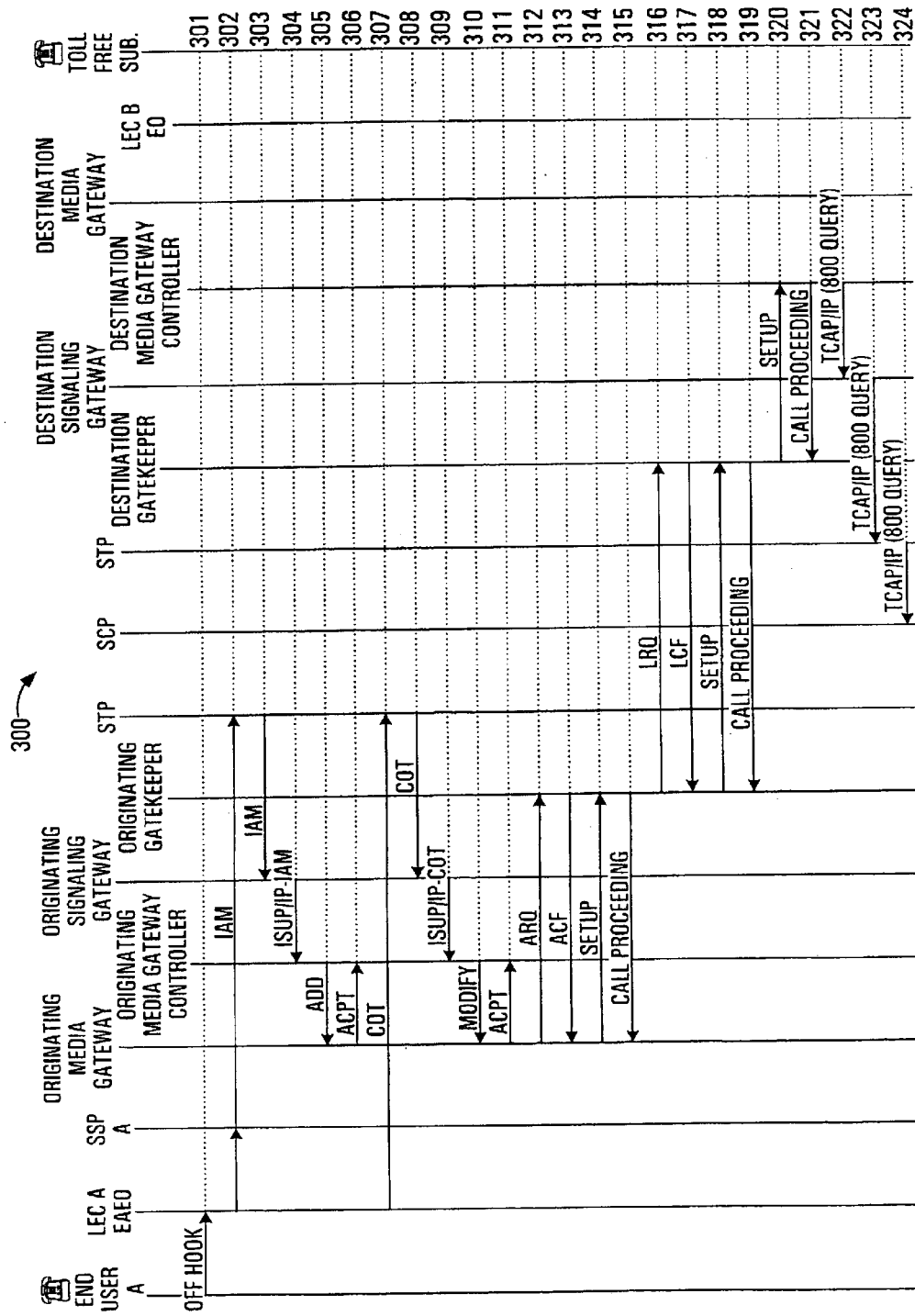
FIGS. 12A–12D are schematic representations of an exemplary signal flow showing the passage of messages between various components of the system shown in FIG. 1.

Referring to FIG. 12A, a caller first goes off hook and dials a toll free number, as indicated at 301. A local exchange carrier (LEC) A on the PSTN 34 recognizes that the call is a toll free call and sends an SS7 Initial Address Message (IAM) to a first Signal Transfer Point (STP) on the PSTN, as shown at 302. The IAM contains a Continuity Test (COT) to verify the voice circuit. The STP then forwards the IAM to an originating Signaling Gateway (SG) of an Internet Services Provider (ISP) on the IP network 46, as indicated at 303.

The Signaling Gateway (SG) in the IP carrier network encapsulates the IAM in an IP packet and sends it to an originating Media Gateway Controller (MGC), as shown at 304. As indicated at 305, the originating MGC then parses the IP encapsulated IAM and sends two ADD messages to an originating Media Gateway (MG)—one to add a Time Division Multiplexing (TDM) termination and one to add a Realtime Transport Protocol (RTP) termination.

The originating MG returns an acknowledge message (ACPT) to the MGC containing the originating MG RTP port address to be used for the voice portion of the call, as indicated at 306. Upon successful completion of the Continuity test, a Service Switching Point (SSP) of carrier A sends a continuity passed message (COT) to the STP as shown at 307, and at 308 the COT passed message is forwarded to the originating SG.

The SG then encapsulates the COT and forwards it to the originating MGC as shown at 309. At 310, upon receipt of the encapsulated COT, the originating MGC modifies the context, created by the ADD command for the continuity check, by sending a MODIFY command to the MG. As indicated at 311, the originating MGC acknowledges the command by sending an ACPT message to the originating MG with identification of the modified connection and session description used to receive audio data. The MODIFY command has now created a one way path, suitable for forwarding ring tones and announcements to the calling party.

As shown at 312, the originating MGC then sends an Admission Request (ARQ) to the originating Gatekeeper (GK). The GK returns an Admission Confirmation Acknowledgement (ACF) as indicated at 313.

At 314, the originating MGC sends a SETUP message to the originating GK, which acknowledges receipt of the SETUP message by sending a CALL PROCEEDING message to the originating MG as shown at 315.

At 316, the originating GK then sends a Location Request (LRQ) message to locate the destination gatekeeper, which returns a Location Request Confirmation (LCF) containing the Call Signaling Channel Transport Address of itself (gatekeeper routed call signaling), as shown at 317.

The originating GK sends a SETUP message to the destination GK Call Signaling Channel Transport Address as shown at 318, and the destination GK acknowledges receipt of the SETUP message by sending a CALL PROCEEDING message to the originating GK, as indicated at 319.

At 320, the destination GK determines the destination MGC and sends a SETUP message to the destination MGC, which then acknowledges the destination GK SETUP message by returning a CALL PROCEEDING message to the destination GK, as indicated at 321.

As shown at 322, the destination MGC then examines the dialed number, recognizes that it is a toll free number and launches an IP encapsulated Transactional Capabilities Application Part (TCAP) query to the destination SG to obtain the terminating routing number.

The destination SG then removes the IP encapsulation and sends the query to a second Signal Transfer Point (STP) as indicated at 323. For simplicity the second STP is shown as being separate from the first STP, however, it will be appreciated that a single STP could be used to perform the functions of both STPs. At 324, the STP performs Global Title Translation (GTT) and sends the query to the 800 SCP.

Figure 12B:
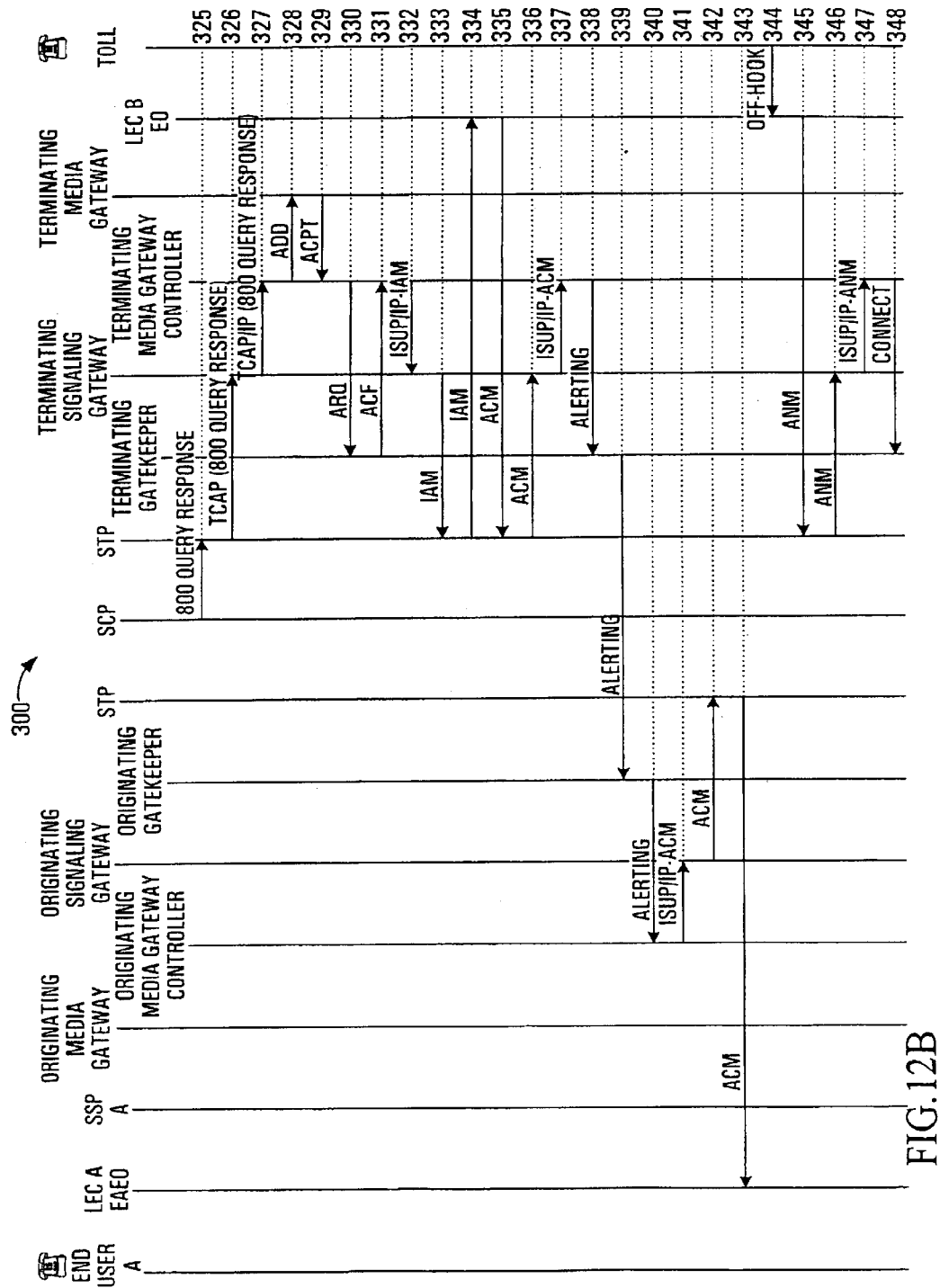

Referring now to FIG. 12B, the 800 SCP then returns the terminating routing number to the STP in a response message, as indicated at 325. At 326, a Message Transfer Part (MTP) of the STP routes the 800 query response to the destination SG, which then encapsulates the 800 query response and sends it to the destination MGC as shown at 327.

At 328, the destination MGC receives the response, determines a trunking gateway connected to Carrier B and sends two ADD commands to the destination MG. As shown at 329, a connection to the outgoing trunk is created. The destination MG sends an accept Token (ACPT) to the destination MGC with identification of the newly created connection and session description used to send/receive audio.

At 330, the destination MGC sends an Admission Request (ARQ) to the destination GK, which returns an Admission Confirmation Acknowledgement (ACF) to the destination MGC as shown at 331.

The destination MGC then sends an IP encapsulated Initial Address Message (IAM) to the destination SG as indicated at 332. At 333, the destination SG removes the IP encapsulation and forwards the IAM to the STP, which in turn forwards the IAM to Local Exchange Carrier (LEC) B, as shown at 334.

At 335, carrier B responds by sending an Address Complete Message (ACM) back to the STP, which then forwards the ACM to the destination SG as indicated at 336. At 337, the destination SG encapsulates the ACM message and transmits it to the destination MGC.

At 338, the destination MGC sends ALERTING to the destination GK, which at 339 sends ALERTING to originating GK, which in turn sends ALERTING to originating MGC as indicated at 340.

The originating MGC maps the ALERTING message to an Address Complete Message (ACM), encapsulates it, and sends it to the originating SG for transmission to Carrier A, as shown at 341. At 342, the originating SG sends the ACM to the STP, which then forwards the ACM to Carrier A as shown at 343.

The called party then goes off-hook, as indicated at 344. At 345, an SSP of the Carrier B then sends an Answer Message (ANM) to the STP which forwards the ANM to the destination SG as shown at 346. At 347, the destination SG encapsulates the ANM and forwards it to the destination MGC.

The destination MGC then sends a CONNECT message to the destination GK which contains its H245 Control Channel Transport Address for use in H245 signaling, as shown at 348.

Figure 12C:
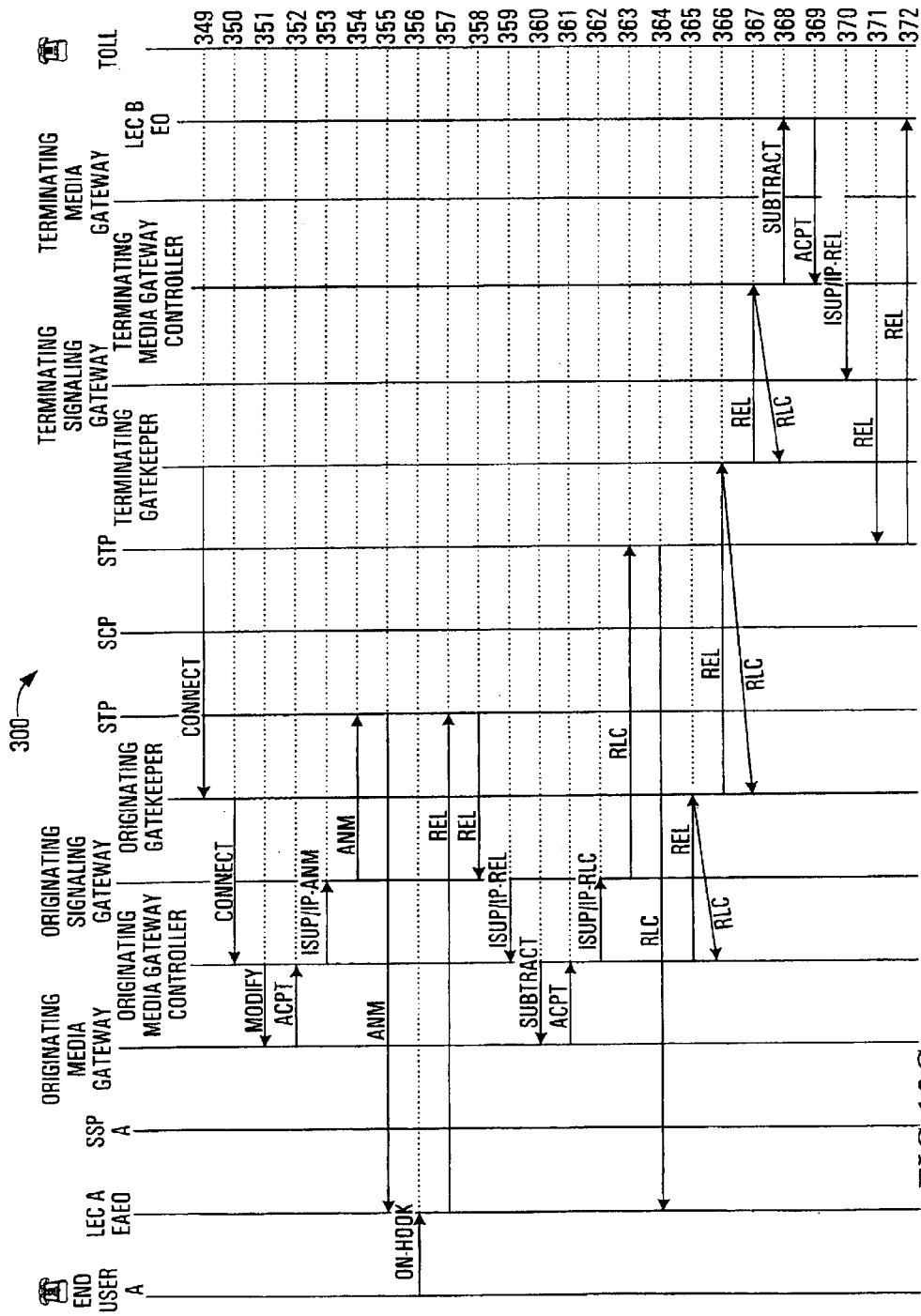

Referring now to FIG. 12C, at 349, the destination GK sends a CONNECT message to the originating GK, which then sends the CONNECT message to the originating MGC as shown at 350.

As indicated at 351, the originating MGC completes the voice path by sending a MODIFY command to the originating MG, which responds by returning an accept Token (ACPT) acknowledgement to the originating MGC as indicated at 352.

The originating MGC then encapsulates an Answer Message (ANM) and sends it to the originating SG to be transmitted to Carrier A, as indicated at 353. At 354, the originating SG removes the IP encapsulation and sends the ANM to the STP, which then forwards the ANM to Carrier A at 355, thus completing the call setup.

When the parties have finished the telephone call, the calling party hangs up the telephone, as shown at 356. At 357, an SSP of Carrier A sends a Release (REL) message to the STP, which then forwards the REL message to the originating SG as indicated at 358. As shown at 359, the originating SG encapsulates the Release (REL) message and sends it to the originating MGC.

As shown at 360, upon receiving the REL message, the originating MGC sends a SUBTRACT command to the originating MG to remove connection/context between the two. The originating MG acknowledges the command by sending an accept Token (ACPT) to the originating MGC, as indicated at 361.

As shown at 362, the originating MGC encapsulates a Release Complete (RLC) message and sends the RLC message to the originating SG. At 363, the originating SG removes the IP encapsulation and forwards the RLC message to the STP, which then sends the RLC message to carrier A as indicated at 364.

The originating MGC then sends a Release (REL) message to the originating gatekeeper, as shown at 365. The originating GK acknowledges the release message by sending a Release Complete message to the originating MGC. As shown at 366, the originating GK also sends a Release (REL) message to the destination GK, which acknowledges the release message by sending a Release Complete message to the originating GK. Similarly, as shown at 367, the destination GK sends a Release (REL) message to the destination MGC, which acknowledges the release by sending a Release Complete message to the destination GK.

As shown at 368, the destination MGC releases the connection/context by sending a SUBTRACT command to the trunking gateway connected to Carrier B. At 369, Carrier B acknowledges the command by sending an accept Token (ACPT) back to the destination MGC.

As shown at 370, the destination MGC then sends a Release command to the destination SG, which at 371 removes the IP encapsulation and sends the Release command to the STP, which then forwards the Release command to Carrier B, as indicated at 372.

Figure 12D:
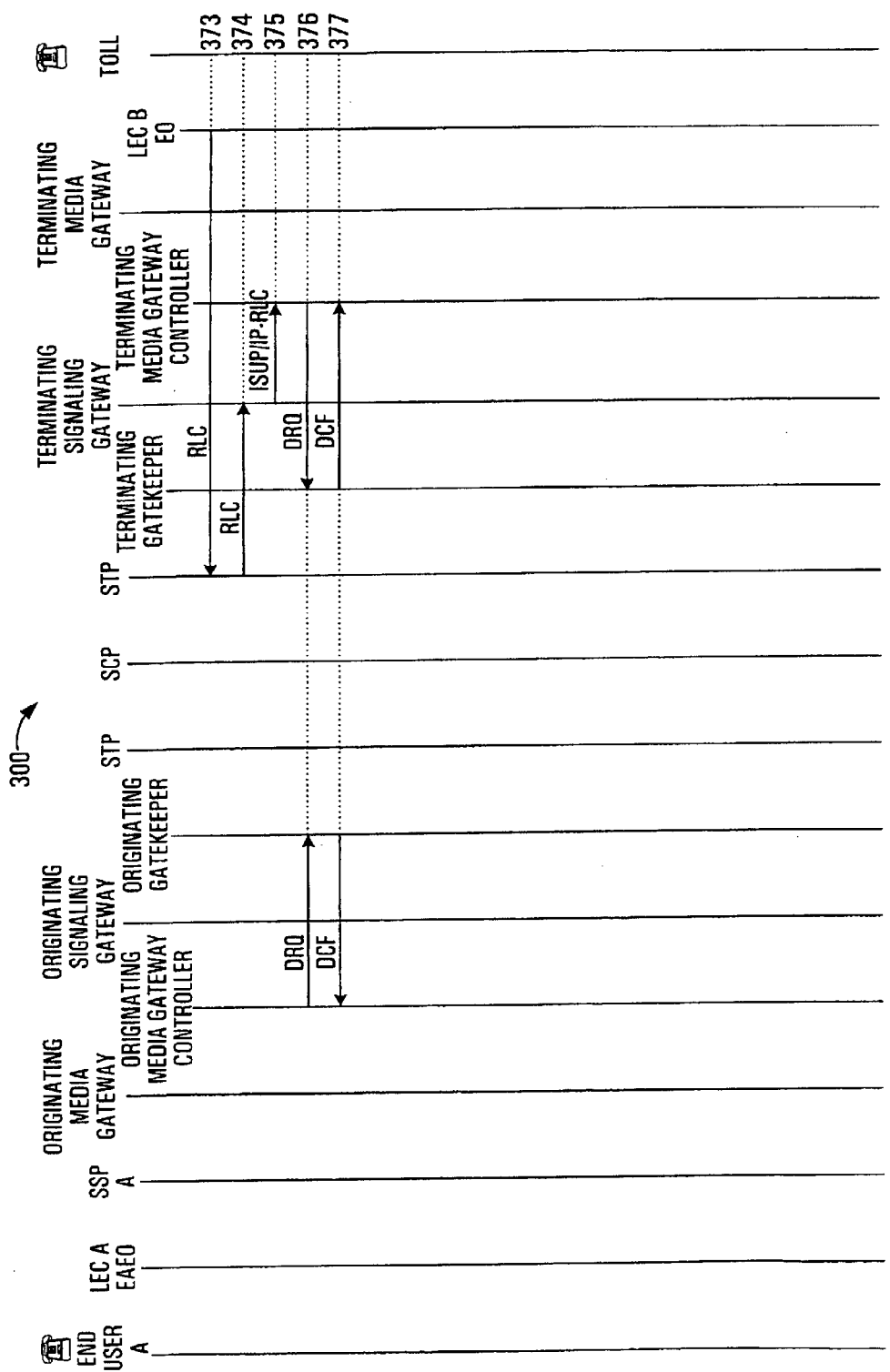

Referring now to FIG. 12D, at 373, Carrier B acknowledges the Release command by sending a Release Complete (RLC) to the STP, which then forwards the RLC to the destination SG as indicated at 374. The destination SG then forwards the Release Complete message to the destination Media Gateway Controller, as shown at 375.

As shown at 376, the originating MGC and the destination MGC each send a Disengage Request (DRQ) to their respective Gatekeepers to inform each Gatekeeper of the release of the bandwidth. The originating and destination Gatekeepers each acknowledge the DRQs by sending a Disengage Confirm (DCF) to their respective MGC.

Although some of the foregoing embodiments have described a Media Gateway Controller as an exemplary Service Switching Function on the packet network, it will be appreciated that the MGC is typically merely one node of a data server. Therefore, in this specification, the tern "Service Switching Function" is intended to include any data server or components or nodes thereof capable of performing the functionality of the SSF or MGC described herein. This definition is intended to be inclusive rather than exhaustive and should not be construed as limiting the generality of the term "Service Switching Function".

In addition, although a single query from an SSF to an SCF has been described, one of ordinary skill in the art upon reading this specification will appreciate that alternatively, additional queries may be made. For example, an SSF may query an SCF for a routing number, then use the routing number to contact a second SSF and if necessary query a second SCP for a second routing number. Similarly, although the foregoing embodiments have described an SSF which is physically separate from an SCF, one of ordinary skill in the art will appreciate that alternatively, an SSF and SCF may be contained within the same physical unit or apparatus.

While specific embodiments of the invention have been described and illustrated, such embodiments should be considered illustrative of the invention only and not as limiting the invention as construed in accordance with the accompanying claims.

What is claimed is:

1. A method for providing a communications service comprising:
    a) receiving, at an Internet Protocol (IP) Service Control Function (SCF-IP) on an IP network, a query relating to implementation of a communications service; and
    b) producing a response to said query to cause said communications service to be implemented.

2. A method as claimed in claim 1 wherein receiving comprises receiving said query at an Internet Protocol (IP) Service Control Point (SCP-IP).

3. A method as claimed in claim 1 wherein receiving comprises receiving a query relating to a toll-free call.

4. A method as claimed in claim 3 wherein producing comprises producing a response comprising a routing number for implementing said toll-free call.

5. A method as claimed in claim 1 wherein:
    a) receiving comprises receiving, from a Service Switching Function (SSF) a query relating to a toll-free call; and
    b) producing comprises communicating a response comprising a routing number for implementing said toll-free call, to said SSF.

6. A method as claimed in claim 1 wherein receiving comprises receiving an Internet Protocol encapsulated enhanced Transactional Capabilities Application Part (TCAP) protocol message.

7. A method as claimed in claim 1 wherein producing comprises producing said response in an Internet Protocol encapsulated enhanced Transactional Capabilities Application Part (TCAP) protocol.

8. A method as claimed in claim 1 further comprising receiving a setup message requesting said communications service.

9. A method as claimed in claim 8 wherein receiving said setup message comprises receiving a call setup message requesting a toll-free call.

10. A method as claimed in claim 9 wherein receiving said setup message comprises receiving a stored address relating to a destination of said toil-free call.

11. A method as claimed in claim 8 further comprising producing said setup message.

12. A method as claimed in claim 11 wherein producing said setup message comprises including in said setup message a stored address relating to said communications service.

13. A method as claimed in claim 12 wherein producing said setup message comprises, including in said setup message, as said stored address, a Domain Naming System (DNS) alias.

14. A method as claimed in claim 12 wherein producing said setup message comprises including in said setup message, as said stored address, an Internet Protocol address.

15. A method as claimed in claim 12 wherein producing said setup message comprises including in said setup message, as said stored address, digits according to an extended dialing format.

16. A method as claimed in claim 12 wherein producing said setup message comprises including in said setup message, as said stored address, digits according to an E.164 extended dialing format.

17. A method as claimed in claim 8 further comprising producing said query in response to receiving said setup message.

18. A method as claimed in claim 1 wherein producing comprises communicating said response to a Service Switching Function (SSF).

19. A method as claimed in claim 18 further comprising receiving said response at said SSF.

20. A method as claimed in claim 19 further comprising implementing said communications service in response to receiving said response.

21. An apparatus for providing a communications service comprising an Internet Protocol (IP) Service Control Function (SCF-IP), the SCF-IP comprising:
    a) a receiver for receiving, on an IP network, a query relating to implementation of a communications service; and
    b) a processing unit in communication with said receiver, said processing unit being programmed to produce a response to said query to cause said communications service to be implemented.

22. An apparatus as claimed in claim 21 wherein said receiver is in communication with a Service Switching Function (SSF) for receiving said query from said SSF.

23. An apparatus as claimed in claim 22 wherein said receiver is in communication with a data server on said IP network for receiving said query from said data server.

24. An apparatus as claimed in claim 22 said receiver is in communication with a Media Gateway Controller (MGC) for receiving said query from said MGG.

25. An apparatus as claimed in claim 22 wherein said receiver is in communication with a Service Switching Function (SSF) on a telephone network for receiving said query on said IP network from said SSF on said telephone network.

26. An apparatus as claimed in claim 25 wherein said receiver is in communication with a Service Switching Point (SSP) on a Public Switched Telephone Network (PSTN) for receiving said query on said IP network from said SSP on said PSTN.

27. An apparatus as claimed in claim 21 wherein said receiver is operable to receive a query relating to implementation of a toll-free call.

28. An apparatus as claimed in claim 27 further comprising a transmitter in communication with said processing unit.

29. A method as claimed in claim 28 wherein said processing unit is programmed to produce a response comprising a routing number for implementing said toll-free call and to control said transmitter to communicate said response.

30. An apparatus as claimed in claim 21 further comprising a transmitter in communication with said processing unit and wherein:
    a) said receiver is in communication with a Service Switching Function (SSF) for receiving from said SSF a query relating to implementation of a toll-free call; and
    b) said processing unit is programmed to produce a response comprising a routing number for implementing said toll-free call, and to control said transmitter to communicate said response to said SSF.

31. An apparatus as claimed in claim 21 wherein said receiver is operable to receive said query in an Internet Protocol encapsulated enhanced Transactional Capabilities Application Part (TCAP) protocol.

32. An apparatus as claimed in claim 21 wherein said processing unit is programmed to produce said response in an Internet Protocol encapsulated enhanced Transactional Capabilities Application Part (TCAP) protocol.

33. A system comprising the apparatus of claim 21 and further comprising a Service Switching Function (SSF) for receiving a setup message requesting said communications service.

34. A system as claimed in claim 33 further comprising a gatekeeper programmed to produce said setup message.

35. A system as claimed in claim 34 wherein said gatekeeper is programmed to include in said setup message a stored address relating to said communications service.

36. A system as claimed in claim 35 wherein said gatekeeper is programmed to include in said setup message, as said stored address, a Domain Naming System (DNS) alias.

37. A system as claimed in claim 35 wherein said gatekeeper is programmed to said gatekeeper is programmed to include in said setup message, as said stored address, an Internet Protocol address.

38. A system as claimed in claim 35 wherein said gatekeeper is programmed to include in said setup message, as said stored address, digits according to an extended dialing format.

39. A system as claimed in claim 35 wherein said gatekeeper is programmed to include in said setup message, as said stored address, digits according to an E.164 extended dialing format.

40. A system as claimed in claim 33 wherein said SSF is programmed to produce said query in response to receiving said setup message.

41. A system as claimed in claim 40 wherein said processing unit is programmed to communicate said response to said SSF.

42. A system as claimed in claim 41 wherein said SSF is programmed to implement said communications service in response to receiving said response.

43. An apparatus for providing a communications service comprising an Internet Protocol (IP) Service Control Function (SCF-IP), the SCF-IP comprising:
    a) means for receiving, on an IP network, a query relating to implementation of a communications service; and
    b) means for producing a response to said query to cause said communications service to be implemented.

44. A computer readable medium for providing instructions for directing a programmable device of an Internet Protocol (IP) Service Control Function (SCF-IP) to:
    a) receive, on an IP network, a query relating to implementation of a communications service; and
    b) produce a response to said query to cause said communications service to be implemented.

45. A computer data signal embodied in a carrier wave comprising:
    a) a code segment for directing a programmable device of an Internet Protocol (IP) Service Control Function (SCF-IP) to receive, on an IP network, a query relating to implementation of a communications service; and
    b) a code segment for directing said programmable device to produce a response to said query to cause said communications service to be implemented.

46. A method for providing a communications service comprising:
    a) receiving, at an Internet Protocol (IP) Service Switching Function (SSF-IP) on an IP network, a message requesting said communications service; and
    b) producing a query relating to implementation of said communications service for receipt by a Service Control Function (SCF), in response to said message, to cause said communications service to be implemented.

47. A method as claimed in claim 46 wherein receiving comprises receiving a setup message.

48. A method as claimed in claim 47 further comprising producing said setup message.

49. A method as claimed in claim 48 wherein producing said setup message comprises including in said setup message a stored address relating to said communications service.

50. A method as claimed in claim 49 wherein producing said setup message comprises including in said setup message, as said stored address, a Domain Naming System (DNS) alias.

51. A method as claimed in claim 49 wherein producing said setup message comprises including in said setup message, as said stored address, an Internet Protocol address.

52. A method as claimed in claim 49 wherein producing said setup message comprises including in said setup message, as said stored address, digits according to an extended dialing format.

53. A method as claimed in claim 49 wherein producing said setup message comprises including in said setup message, as said stored address, digits according to an E.164 extended dialing format.

54. A method as claimed in claim 46 wherein receiving comprises receiving a call setup message requesting a toll-free call.

55. A method as claimed in claim 46 wherein receiving comprises receiving said message at a data server.

56. A method as claimed in claim 46 wherein receiving comprises receiving said message at a Media Gateway Controller.

57. A method as claimed in claim 46 further comprising communicating said query to said SCF.

58. A method as claimed in claim 57 wherein communicating comprises communicating said query according to an enhanced Transactional Capabilities Application Part (TCAP) protocol.

59. A method as claimed in claim 57 wherein communicating comprises communicating said query to a Service Control Point.

60. A method as claimed in claim 57 wherein communicating comprises communicating said query to a Service Control Point on said IP network.

61. A method as claimed in claim 57 wherein communicating comprises communicating said query to a Service Control Point on a telephone network.

62. A method as claimed in claim 57 further comprising receiving information from said SCF in response to said query.

63. A method as claimed in claim 62 wherein receiving information comprises receiving said information in an Internet Protocol encapsulated enhanced Transactional Capabilities Application Part (TCAP) protocol.

64. A method as claimed in claim 62 further comprising implementing said communications service in response to receiving said information.

65. A method as claimed in claim 62 wherein:
   a) producing and communicating comprise producing and communicating a query relating to implementation of a toll-free call; and
   b) receiving information comprises receiving a routing number from said SCF.

66. A method as claimed in claim 65 further comprising implementing said toll-free call in response to receiving said information.

67. A method as claimed in claim 66 wherein implementing said toll-free call comprises terminating said call to a destination on said IP network.

68. A method as claimed in claim 66 wherein implementing said toll-free call comprises terminating said call to a destination on a telephone network.

69. A method as claimed in claim 46 further comprising producing a response to said query to cause said communications service to be implemented.

70. An apparatus for providing a communications service comprising an Internet Protocol (IP) Service Switching Function (SSF-IP), the SSF-IP comprising:
   a) a receiver for receiving, on an IP network, a message requesting said communications service; and
   b) a processing unit in communication with said receiver, said processing unit being programmed to produce a query relating to implementation of said communications service for receipt by a Service Control Function (SCF), in response to said message, to cause said communications service to be implemented.

71. An apparatus as claimed in claim 70 wherein said receiver is in communication with a gatekeeper for receiving said message from said gatekeeper.

72. An apparatus as claimed in claim 70 further comprising a transmitter in communication with said processing unit and said SCF for communicating said query to said SCF.

73. An apparatus as claimed in claim 72 wherein said processing unit is programmed to produce said query according to an enhanced Transactional Capabilities Application Part (TCAP) protocol.

74. An apparatus as claimed in claim 72 wherein said processing unit is programmed to control said transmitter to communicate said query to a Service Control Point.

75. An apparatus as claimed in claim 72 wherein said processing unit is programmed to control said transmitter to communicate said query to a Service Control Point on said IP network.

76. An apparatus as claimed in claim 72 wherein said processing unit is programmed to control said transmitter to communicate said query to a Service Control Point on a telephone network.

77. An apparatus as claimed in claim 72 wherein said receiver is in communication with said SCF for receiving information from said SCF in response to said query.

78. An apparatus as claimed in claim 77 said receiver is operable to receive said information in an Internet Protocol encapsulated enhanced Transactional Capabilities Application Part (TCAP) protocol.

79. An apparatus as claimed in claim 77 wherein said processing unit is programmed to implement said communications service in response to receiving said information.

80. An apparatus as claimed in claim 77 wherein said processing unit is programmed to:
   a) produce a query relating to implementation of a toll-free call;
   b) control said transmitter to communicate said query to said SCF; and
   c) cooperate with said receiver to receive a routing number in said information from said SCF.

81. An apparatus as claimed in claim 80 wherein said processing unit is programmed to implement said toll-free call in response to receiving said information.

82. An apparatus as claimed in claim 81 wherein said processing unit is programmed to terminate said call to a destination on said IP network.

83. An apparatus as claimed in claim 81 wherein said processing unit is programmed to terminate said call to a destination on a telephone network.

84. A system comprising the apparatus of claim 70 and further comprising a gatekeeper programmed to produce said message requesting said communications service as a setup message.

85. A system as claimed in claim 84 wherein said gatekeeper is programmed to include in said setup message a stored address relating to said communications service.

86. A system as claimed in claim 85 wherein said gatekeeper is programmed to include in said setup message, as said stored address, a Domain Naming System (DNS) alias.

87. A system as claimed in claim 85 wherein said gatekeeper is programmed to include in said setup message, as said stored address, an Internet Protocol address.

88. A system as claimed in claim 85 wherein said gatekeeper is programmed to include in said setup message, as said stored address, digits according to an extended dialing format.

89. A system as claimed in claim 85 wherein said gatekeeper is programmed to include in said setup message, as said stored address, digits according to an E.164 extended dialing format.

90. A system comprising the apparatus of claim 70 and further comprising a Service Control Function (SCF) programmed to produce a response to said query to cause said communications service to be implemented.

91. An apparatus for providing a communications service comprising an Internet Protocol (IP) Service Switching Function (SSF-IP), the SSF-IP comprising:
   a) means for receiving, on an IP network, a message requesting said communications service; and
   b) means for producing a query relating to implementation of said communications service for receipt by a Service Control Function (SCF), in response to said message, to cause said communications service to be implemented.

92. A computer readable medium for providing instructions for directing a programmable device of an Internet Protocol (IP) Service Switching Function (SSF-IP) to:

a) receive, on an IP network, a message requesting said communications service; and b) produce a query relating to implementation of said communications service for receipt by a Service Control Function (SCF), in response to said message, to cause said communications service to be implemented.

93. A computer data signal embodied in a carrier wave comprising:

a) a code segment for directing a programmable device of an Internet Protocol (IP) Service Switching Function (SSF-IP) to receive, on an IP network, a message requesting said communications service; and b) a code segment for directing said programmable device to produce a query relating to implementation of said communications service for receipt by a Service Control Function (SCF), in response to said message, to cause said communications service to be implemented.

94. A method of communication comprising establishing, on a packet network, a toll-free call, wherein establishing comprises receiving, on an Internet Protocol (IP) network:

a) a message requesting said toll-free call; or b) a query relating to implementation of said toll-free call, produced in response to said message.

95. A method as claimed in claim 94 wherein establishing comprises:

a) receiving, on the IP network, the message requesting said toll-free call;

b) producing the query relating to implementation of said toll-free call for receipt by a Service Control Function (SCF), in response to said message;

c) receiving said query at said SCF; and d) producing, at said SCF, a response to said query, said response comprising a routing number, to cause said toll-free call to be implemented.

96. A method as claimed in claim 94 wherein establishing comprises:

a) receiving the message requesting said toll-free call;

b) producing the query relating to implementation of said toll-free call for receipt by a Service Control Function (SCF), in response to said message;

c) receiving said query on the IP network, at said SCF; and d) producing, at said SCF, a response to said query, said response comprising a routing number, to cause said toll-free call to be implemented.

97. A system for communication comprising at least one network node programmed to establish, on a packet network, a toll-free call, wherein said at least one network node comprises a receiver for receiving, on an internet Protocol (IP) network:

a) a message requesting said toll-free call; or b) a query relating to implementation of said toll-free call, produced in response to said message.

98. A system as claimed in claim 97 wherein said at least one node comprises:

a) a Service Switching Function (SSF) comprising:
  i) said receiver for receiving, on the IP network, the message requesting said toll-free call;
  ii) a processing unit in communication with said receiver, said processing unit being programmed to produce the query relating to implementation of said toll-free call for receipt by a Service Control Function (SCF), in response to said message;

b) a Service Control Function (SCF) comprising:
  i) a receiver for receiving said query; and
  ii) a processing unit in communication with said receiver, said processing unit being programmed to produce a response to said query, said response comprising a routing number, to cause said toll-free call to be implemented.

99. A system as claimed in claim 97 wherein said at least one node comprises:

a) a Service Switching Function (SSF) comprising:
  i) a receiver for receiving the message requesting said toll-free call;
  ii) a processing unit in communication with said receiver, said processing unit being programmed to produce the query relating to implementation of said toll-free call for receipt by a Service Control Function (SCF), in response to said message;

b) a Service Control Function (SCF) comprising:
  i) said receiver for receiving said query on the IP network; and
  ii) a processing unit in communication with said receiver, said processing unit being programmed to produce a response to said query, said response comprising a routing number, to cause said toll-free call to be implemented.

100. A computer readable medium for providing instructions for directing a programmable device to establish a toll-free call on a packet network, said instructions comprising instructions for directing said programmable device to receive, on an Internet Protocol (IP) network:

a) a message requesting said toll-free call; or b) a query relating to implementation of said toll-free call, produced in response to said message.

101. A computer data signal embodied in a carrier wave comprising code segments for directing a programmable device to establish a toll-free call on a packet network, said code segments comprising code segments for directing said programmable device to receive, on an Internet Protocol (IP) network:

a) a message requesting said toll-free call; or b) a query relating to implementation of said toll-free call, produced in response to said message.

102. A method of extending packet network functionality comprising establishing an intelligent network service on a packet network, wherein establishing comprises receiving, on an Internet Protocol (IP) network:

a) a message requesting said intelligent network service; or b) a query relating to implementation of said intelligent network service, produced in response to said message.

103. A method as claimed in claim 102 wherein establishing comprises:

a) receiving, on the IP network, the message requesting said intelligent network service;

b) producing the query relating to implementation of said intelligent network service for receipt by a Service Control Function (SCF), in response to said message, c) receiving said query at said SCF; and d) producing, at said SCF, a response to said query to cause said intelligent network service to be implemented.

104. A method as claimed in claim 102 wherein establishing comprises:

a) receiving the message requesting said intelligent network service;

b) producing the query relating to implementation of said intelligent network service for receipt by a Service Control Function (SCF), in response to said message;

c) receiving said query on the IP network, at said SCF; and d) producing, at said SCF, a response to said query to cause said intelligent network service to be implemented.

105. A system for communication comprising at least one network node programmed to establish an intelligent network service on a packet network, wherein said at least one network node comprises a receiver for receiving, on an Internet Protocol (IP) network:

a) a message requesting said intelligent network service; or b) a query relating to implementation of said intelligent network service, produced in response to said message.

106. A system as claimed in claim 105 wherein said at least one node comprises:

a) a Service Switching Function (SSF) comprising:
  i) said receiver for receiving, on the IP network, the message requesting said intelligent network service;
  ii) a processing unit in communication with said receiver, said processing unit being programmed to produce the query relating to implementation of said intelligent network service for receipt by a Service Control Function (SCF), in response to said message;

b) a Service Control Function (SGF) comprising:
  i) a receiver for receiving said query; and
  ii) a processing unit in communication with said receiver, said processing unit being programmed to produce a response to said query to cause said intelligent network service to be implemented.

107. A system as claimed in claim 105 wherein said at least one node comprises:

a) a Service Switching Function (SSF) comprising:
  i) a receiver for receiving the message requesting said intelligent network service;
  ii) a processing unit in communication with said receiver, said processing unit being programmed to produce the query relating to implementation of said intelligent network service for receipt by a Service Control Function (SCF), in response to said message;

b) a Service Control Function (SCF) comprising:
  i) said receiver for receiving said query on the IP network; and
  ii) a processing unit in communication with said receiver, said processing unit being programmed to produce a response to said query to cause said intelligent network service to be implemented.

108. A computer readable medium for providing instructions for directing a programmable device to establish an intelligent network service on a packet network, said instructions comprising instructions for directing said programmable device to receive, on an Internet Protocol (IP) network:

a) a message requesting said intelligent network service; or b) a query relating to implementation of said intelligent network service, produced in response to said message.

109. A computer data signal embodied in a carrier wave comprising code segments for directing a programmable device to establish an intelligent network service on a packet network, said code segments comprising code segments for directing said programmable device to receive, on an Internet Protocol (IP) network:

a) a message requesting said intelligent network service; or b) a query relating to implementation of said intelligent network service, produced in response to said message.

110. A method for providing a communications service comprising:

a) receiving, on a packet network, a query relating to implementation of a communications service; and b) producing a response to said query to cause said communications service to be implemented on said packet network.

* * * * *

UNITED STATES PATENT AND TRADEMARK OFFICE
CERTIFICATE OF CORRECTION

| | | |
|---|---|---|
| PATENT NO. | : 6,791,971 B1 | Page 1 of 1 |
| APPLICATION NO. | : 09/452146 | |
| DATED | : September 14, 2004 | |
| INVENTOR(S) | : Osman et al. | |

It is certified that error appears in the above-identified patent and that said Letters Patent is hereby corrected as shown below:

In the Claims

Column 16, line 8
  replace "toil-free call"
  with --toll-free call--

Column 16, line 58
  replace "claim 22 said receiver"
  with --claim 22, wherein said receiver--

Column 16, line 60
  replace "MGG"
  with --MGC--

Column 17, lines 44-45
  replace "said gatekeeper is programmed to said gatekeeper is programmed to"
  with --said gatekeeper is programmed to--

Signed and Sealed this
Twenty-third Day of December, 2014

Michelle K. Lee
*Deputy Director of the United States Patent and Trademark Office*